(12) United States Patent
Jiang et al.

(10) Patent No.: US 12,444,161 B2
(45) Date of Patent: Oct. 14, 2025

(54) HYPERSPECTRAL IMAGE DISTRIBUTED RESTORATION METHOD AND SYSTEM BASED ON GRAPH SIGNAL PROCESSING AND SUPERPIXEL SEGMENTATION

(71) Applicants: Hangzhou Institute of Technology, Xidian University, Hangzhou (CN); Guilin University of Electronic Technology, Guilin (CN); Yangtze Delta Region Institute (Huzhou), University of Electronic Science and Technology of China, Huzhou (CN)

(72) Inventors: Junzheng Jiang, Guilin (CN); Wanyuan Cai, Wenzhou (CN); Jiang Qian, Chengdu (CN)

(73) Assignees: Hangzhou Institute of Technology, Xidian University, Hangzhou (CN); Guilin University of Electronic Technology, Guilin (CN); Yangtze Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 443 days.

(21) Appl. No.: 18/096,054

(22) Filed: Jan. 12, 2023

(65) Prior Publication Data
US 2024/0046602 A1  Feb. 8, 2024

(30) Foreign Application Priority Data

Aug. 4, 2022  (CN) .......................... 2022109338569

(51) Int. Cl.
*G06V 10/426* (2022.01)
*G06T 5/70* (2024.01)
(Continued)

(52) U.S. Cl.
CPC .............. *G06V 10/426* (2022.01); *G06T 5/70* (2024.01); *G06T 7/11* (2017.01); *G06V 10/803* (2022.01); *G06T 2207/10036* (2013.01)

(58) Field of Classification Search
CPC .............. G06T 5/70; G06T 7/12; G06T 7/162; G06T 2207/20021; G06V 20/194; G06F 17/16
See application file for complete search history.

(56) References Cited

FOREIGN PATENT DOCUMENTS

| CN | 110400276 A | * | 11/2019 | ............... G06T 5/70 |
| CN | 113160069 A | * | 7/2021 | ............... G06T 7/13 |

(Continued)

*Primary Examiner* — Anand P Bhatnagar
*Assistant Examiner* — Zaid Muhammad Saleh
(74) *Attorney, Agent, or Firm* — Hemisphere Law, PLLC; Zhigang Ma

(57) ABSTRACT

Provide is a novel mixed-noise removal method for HSI with large size. First, the underlying structure of the HSI is modeled by a two-layer architecture graph. The upper layer, called a skeleton graph, is a rough graph constructed by using the modified k-nearest-neighborhood algorithm and its nodes correspond to a series of superpixels formed by HSI segmentation, which can efficiently characterize the inter-correlations between superpixels, while preserving the boundary information and reducing the computational complexity. The lower layer, called detailed graph, consists of a series of local graphs which are constructed to model the similarities between pixels. Second, based on the two-layer graph architecture, the HSI restoration problem is formulated as a series of optimization problems each of which resides on a subgraph. Third, a novel distributed algorithm is tailored for the restoration problem, by using the information interaction between the nodes of skeleton graph and subgraphs.

9 Claims, 8 Drawing Sheets

(51) Int. Cl.
*G06T 7/11* (2017.01)
*G06V 10/80* (2022.01)

(56) References Cited

FOREIGN PATENT DOCUMENTS

| | | | | | |
|---|---|---|---|---|---|
| CN | 114022786 A | * | 2/2022 | ............ | G06N 3/045 |
| CN | 114463173 A | * | 5/2022 | ............ | G06F 18/24 |

* cited by examiner

HYPERSPECTRAL IMAGE DISTRIBUTED RESTORATION METHOD AND SYSTEM BASED ON GRAPH SIGNAL PROCESSING AND SUPERPIXEL SEGMENTATION

TECHNICAL FIELD

The present disclosure relates to the technical field of hyperspectral data processing and graph signal processing, and in particularly, to a hyperspectral image distributed restoration method and system based on graph signal processing and superpixel segmentation.

DESCRIPTION OF RELATED ART

A hyperspectral image (HSI) is composed of dozens or even hundreds of gray images corresponding to spectral channels, and has a high spectral resolution and rich texture information. Based on HSI features, a combination of a spatial image and a spectral band can provide favorable conditions for the extraction of target features. Therefore, the HSI is widely used in food quality and safety assessment, medical diagnosis and image-guided surgery, precision agriculture and other fields. However, the HSI is often disturbed by various noises in a process of acquisition and transmission. These noises bring great challenges to a subsequent analysis, especially in feature extraction and target detection, which will greatly reduce the reliability of processing. Therefore, how to effectively remove the noises of the HSI has become a key issue.

At present, various denoising methods have been proposed to restore the HSI. The traditional methods of HSI denoising include: regarding each band as a gray image, and applying a two-dimensional denoising method such as a block matching and 3D collaborative filtering (BM3D) algorithm to remove noise band by band. However, these methods ignore high correlation between spectral bands or spatial pixels, resulting in relatively poor restoration performance. In view of this, various HSI denoising methods have been proposed to consider the correlation, for example, a hybrid spatial-spectral noise reduction (HSSNR) method, where a wavelet shrinkage model in the derivative domain of mixed spatial spectrum was proposed, which considers the difference of signal regularity in spatial and spectral dimensions; color total variation (CTV) and spectral spatial adaptive hyperspectral total variation (SSAHTV), which apply an image operator called total variation (TV) to HSI restoration, the image operator describes a spatial piecewise smoothness (PWS) characteristic of the HSI; low-rank matrix recovery (LRMR), which uses a low-dimensional structure in high-dimensional data to remove noise based on low-rank (LR) matrix approximation; tensor subspace low-rank learning with non-local prior for hyperspectral image mixed denoising (TSLRLN) and total variation regularized low-rank tensor decomposition (LRTDTV), which utilize LR characteristic of the HSI based on tensor decomposition; Global and Nonlocal Low-Rank Factorizations (GLF), which combines different LR characteristics, etc. These methods effectively represent the spatial and spectral correlation of the HSI. In addition, there are some nonlocal methods, such as Nonlocal Tensor-Ring Decomposition (NLTR) and non-local meets global (NGMeet), which denoise the HSI group by group, but these methods only consider nonlocal self-similarity and ignore PWS characteristics in groups. Total Variation Regularization and Nonlocal Low-Rank Tensor Decomposition (TVNLRTD) regards a non-local self-similarity as a regularization term in a model, and combines the regularization term with other global regularization terms (such as TV), in which good restoration performance is achieved through combining the regularization term with the other global regularization terms, but it cannot simply restore the HSI group by group, and a disadvantage of high complexity of single computing node in large-scale HSI is brought out. Different from the non-local-based method, a superpixel segmentation-based method, such as superpixel segmentation of smooth band (SSSB) groups pixels of the HSI into a series of uniform regions, a shape of each region depends on boundary information, and the shape is irregular. Therefore, the method superpixel segmentation-based method can effectively preserve the boundary information, while the non-local-based method cannot preserve the boundary information because of square patch-based strategy. However, the existing superpixel segmentation-based methods, such as SSSB, do not perform well in HSI restoration, partly because they do not consider the PWS characteristics of the HSI and the similarity between superpixels. In view of the shortcomings of the above methods, graph signal processing (GSP) is considered, which is a multi-disciplinary research field, uses graph topology to describe the correlation between network data, comprehensively constructs the theoretical framework of network data processing, and greatly expands the theoretical boundary of classical signal processing. Therefore, a hyperspectral mixed noise removal method based on GSP and superpixel segmentation can be proposed.

Moreover, the existing methods usually focus on a small-scale HSI or a subregion of large-scale HSI and they exhibit poor scalability on large HSI since they employ the centralized operators in general. Besides, several restoration methods transform the three-dimensional HSI dataset into a two-dimensional matrix, an ill-posed matrix where the spatial dimension greatly exceeds the spectral one, resulting in blurring and a loss of details in denoised results. For large-scale HSI, the loss of boundary information and texture details will be more serious.

In addition, the existing HSI is often disturbed by various noises, which brings great challenges to the subsequent applications. Many existing restoration methods are not suitable for large-scale HSI, so how to improve the scalability of the restoration methods is a key issue.

SUMMARY

In view of this, objectives of the present disclosure are to provide a large-scale hyperspectral image (HSI) distributed restoration method based on graph signal processing and superpixel segmentation.

To achieve the above objectives, the present disclosure provides the following technical solutions.

A large-scale hyperspectral image distributed restoration method based on graph signal processing and superpixel segmentation is provided according to an embodiment of the present disclosure, which includes:
  step 1, constructing an input signal model, to linearly normalize a hyperspectral image to obtain a normalized hyperspectral image;
  step 2, selecting an image corresponding to a target-band from the normalized hyperspectral image, and pre-denoising the image to obtain a pre-denoised image;
  step 3, segmenting the pre-denoised image into multiple superpixel regions using simple linear iterative cluster (SLIC) superpixel segmentation algorithm;
  step 4, constructing a skeleton graph based on the multiple superpixel regions;

step 5, constructing a local graph for all pixels of each of the multiple superpixel regions, to obtain multiple local graphs respectively corresponding to the multiple superpixel regions;

step 6, constructing sub-graphs based on the skeleton graph and the multiple local graphs, each of the sub-graphs being corresponding to a computing node;

step 7, applying an exchange distributed mode to each of the sub-graphs, to perform distributed denoising on the hyperspectral image;

step 8, establishing an optimization model of each of the sub-graphs, based on the each of the sub-graphs; and step 9, repeating step 7 and step 8 through multiple iterations, where each of the multiple iterations adopts the exchange distributed mode in the step 7 to iteratively solve the optimization model in the step 8; and in a situation that each of the sub-graphs being meeting an iterative convergence condition, the multiple iterations are stopped, and a corresponding sub-graph of the sub-graphs meeting the iterative convergence condition is no longer updated while other sub-graphs of the sub-graphs not meeting the iterative convergence condition continue to participate the multiple iterations.

In a further embodiment, in the step 4, the constructing the skeleton graph based on the multiple superpixel regions, includes:

modeling the multiple superpixel regions as multiple skeleton graph nodes respectively, where a graph signal of each skeleton graph node of the multiple skeleton graph nodes is an average value of values of all pixels in a superpixel region of the multiple superpixel regions corresponding to the skeleton graph node, a coordinate of the skeleton graph node is a coordinate of a center pixel of the all pixels whose intensity is closest to the graph signal; and constructing the skeleton graph $\widetilde{\mathcal{G}_s}:=(\hat{V}_s, \widetilde{E_s}, \widetilde{A_s})$ based on the multiple skeleton graph nodes using a modified k-Nearest Neighbor (KNN) algorithm, where $\hat{V}_s$ represents a node set composed of the multiple skeleton graph nodes, $\widetilde{E_s}$ represents an edge set composed of edges of the skeleton graph, and $\widetilde{A_s}$ represents a skeleton graph adjacency matrix, which is used to describe a correlation weight matrix of the edges of the skeleton graph, where the skeleton graph adjacency matrix $\widetilde{A_s}$ is determined by:

determining an initial skeleton graph adjacency matrix based on an element $a_{i,j}$ of the initial skeleton graph adjacency matrix, the element $a_{i,j}$ is expressed as a formula (1):

$$a_{i,j} = \exp\left(-\frac{\|I_i - I_j\|_2^2}{\sigma_1^2}\right)\exp\left(-\frac{\|x_i - x_j\|_2^2}{\sigma_x^2}\right), \quad (1)$$

where $I_i$ represents a coordinate of the i-th superpixel of all pixels of each of the multiple superpixel regions; $I_j$ represents a coordinate of the j-th superpixel of all pixels of each of the multiple superpixel regions; $x_i$ represents a graph signal of the i-th superpixel of all pixels of each of the multiple superpixel regions; $x_j$ represents a graph signal of the j-th superpixel of all pixels of each of the multiple superpixel regions; and $\sigma_1$ and $\sigma_x$ represent two constant parameters; and setting first k relative greater values of each row of the initial skeleton graph adjacency matrix to 1, setting the rest of the row of the initial skeleton graph adjacency matrix to 0, and symmetrizing and modifying the initial skeleton graph adjacency matrix after setting into an unweighted matrix as the skeleton graph adjacency matrix $\widetilde{A_s}$.

In a further embodiment, in the step 5, the m-th superpixel region of the multiple superpixel regions has $K_m$ pixels, and the constructing the local graph for all pixels of each of the multiple superpixel regions, to obtain the multiple local graphs respectively corresponding to the multiple superpixel regions, includes:

modeling all pixels of each of the multiple superpixel regions as pixel nodes, to thereby construct the multiple local graph $\widetilde{\mathcal{G}_m}:=(\widetilde{V_m}, \widetilde{E_m}, \widetilde{A_m})$, where $\widetilde{V_m}$ represents a node set composed of all pixel nodes in the m-th superpixel region, $\widetilde{E_m}$ represents an edge set composed of edges for connecting each pixel node of the all pixel nodes in the m-th superpixel region to surrounding four neighbors of the pixel node, and $\widetilde{A_m}$ represents an unweighted four-neighborhood adjacency matrix;

where a graph signal of each of the multiple local graphs is a vector $x_m = [x_{m,1}, x_{m,2}, \ldots, x_{m,K_m}]^T \in \mathbb{R}^{K_m}$, a graph signal of an image corresponding to the b-th band of the hyperspectral image is $X_{m,b} = [X_m(1,b), X_m(2,b), \ldots, X_m(K_m,b)]^T \in \mathbb{R}^{K_m}, b=1, \ldots, p$, and the local graph is applied to an image corresponding to each band of the hyperspectral image;

where a matrix is formed based on graph signals of all bands, as a graph signal of the hyperspectral image, expressed as: $X_m = [X_m(i,b)] = [X_{m,1}, \ldots, X_{m,b}, \ldots, X_{m,p}] \in \mathbb{R}^{K_m \times p}$, where $X_m(i, b)$ represents the i-th graph signal of the image corresponding to the b-th band of the hyperspectral image; $X_{m,b}$ represents the m-th graph signal of the image corresponding to the b-th band of the hyperspectral image, and $\mathbb{R}^{K_m \times p}$ represents a dimension $K_m \times p$ of the matrix.

In a further embodiment, in the step 6, a hyperspectral restoration problem is transformed into solving of multiple small-scale problems, each sub-graph of the multiple small-scale problems is located on one of the sub-graphs, and each sub-graph is centered on one of the multiple skeleton graph nodes of the skeleton graph;

where the f-th sub-graph $\overline{\mathcal{G}_f}$ of the sub-graphs is expressed as a formula (2):

$$\overline{\mathcal{G}_f} := (\overline{V_f}, \overline{E_f}), f=1,2,\ldots,M_s \quad (2),$$

where $$\overline{V_f} = \{\widetilde{V_m}\}_{m \in B_{\widetilde{\mathcal{G}_s}}(f,d)},$$

represents the f-th sub-graph, $\overline{V_f}$ represents a node set composed of all sub-graph nodes of the f-th sub-graph, $\overline{E_f}$ represents an edge set composed of edges between the all sub-graph nodes of the f-th sub-graph, $M_s$ represents of a total number of the sub-graphs, and f represents an integer;

where $B_{\widetilde{\mathcal{G}_s}}(f,d) := \{j \in \hat{V}_s : \rho(f,j) \leq d\}$ represents a set of neighbor sub-graph nodes of a sub-graph node f of the f-th sub-graph within d hops;

where ρ(f,j) represents a shortest path from the sub-graph node f to a sub-graph node j;

where each sub-graph includes at least two of the multiple local graphs, the m-th local graph of the at least two of the multiple local graphs is one sub-graph node of the set of neighbor sub-graph nodes of the sub-graph node f corresponding to the f-th sub-graph within the d hops, that is m∈ $B_{\widehat{\mathcal{G}}_s}(f,d)$;

where d represents the set of neighbor sub-graph nodes within the d hops, m represents the m-th local graph and is a sub-graph node of the f-th sub-graph, $\widetilde{V_m}$ represents the node set composed of all pixel nodes in the m-th superpixel region of the multiple superpixel regions, $B_{\widehat{\mathcal{G}}_s}(f,d)$ represents the set of neighbor sub-graph nodes of the sub-graph node f corresponding to the f-th sub-graph of the skeleton graph $\widehat{\mathcal{G}}_s$ within the d hops;

where the edge set $\overline{E_f}$ is obtained by: connecting a boundary node to four neighborhood nodes of the boundary node, and forming an edge between the pixel nodes of a local graph $\widetilde{V_m}$ and the local graph $\widetilde{\mathcal{G}_m}$, if there is a boundary connection for the local graph $\widetilde{\mathcal{G}_f}$ and the local graph $\widetilde{\mathcal{G}_m}$ in corresponding superpixel regions thereof, or, forming only the edge between the pixel nodes of the local graph $\widetilde{\mathcal{G}_f}$ and the local graph $\widetilde{\mathcal{G}_m}$, if there is no boundary connection for the local graph $\widetilde{\mathcal{G}_f}$ and the local graph $\widetilde{\mathcal{G}_m}$ in corresponding superpixel regions thereof, that is, there is edge connection between the pixel nodes of the local graph $\widetilde{\mathcal{G}_f}$ and the local graph $\widetilde{\mathcal{G}_m}$;

where a Laplacian matrix $\overline{L_f}$ of the f-th sub-graph $\overline{\mathcal{G}_f}$ is obtained, and a same sub-graph is applied to all bands of the hyperspectral image corresponding to the sub-graph;

where a graph signal of the sub-graph node v∈$\overline{V}_f$ of the f-th sub-graph is mapped into a vector $X_{f,b}=[X_f(1,b), X_f(2,b), \ldots, X_f(\Sigma K_m,b)]^T \in \mathbb{R}^{\Sigma K_m}$, where m∈ $B_{\widehat{\mathcal{G}}_s}(f,d)$, b=1, ..., p, $X_f(i,b)$ represents a graph signal of the i-th sub-graph node corresponding to the b-th band in the f-th sub-graph $\overline{\mathcal{G}_f}$, $X_f(1, b)$ represents a graph signal of a first sub-graph node corresponding to the b-th band in the f-th sub-graph $\overline{\mathcal{G}_f}$, $K_m$ represents a total number of pixels in the superpixel region corresponding to the m-th local graph on the f-th sub-graph $\overline{\mathcal{G}_f}$, and b represents the b-th band; and where a matrix is formed based on graph signals of all bands using a formula expressed as follows: $X_f=[X_f(i,b)]=[X_{f,1}, \ldots, X_{f,b}, \ldots, X_{f,p}] \in \mathbb{R}^{(\Sigma K_m) \times p}$, m∈ $B_{\widehat{\mathcal{G}}_s}(f,d)$, and thus the graph signal of the hyperspectral image on the sub-graph $\overline{\mathcal{G}_f}$, f=1, 2, ..., $M_s$ is obtained.

In a further embodiment, in the step 7, multiple computing units are set, each of the plurality of computing units corresponds to one of the multiple local graphs, and a transmission link with neighbored computing units of the computing unit is established by the computing unit based on edges of the skeleton graph, and where the applying the exchange distributed mode to each of the sub-graphs to perform distributed denoising on the hyperspectral image, includes:

receiving computing results from the neighbored computing units when each of multiple iterations is performed;

fusing and averaging, by the computing unit, the received computing results from the neighbored computing units with a last calculation result of the computing unit;

determining, by the computing unit, an optimized computing result of the computing unit and optimized computing results of the neighbored computing units based on the optimization model of each of the sub-graphs; and transmitting, by the computing unit, the optimized computing result of the computing unit and a corresponding one of the optimized computing results of the neighbored computing units to a corresponding one of the neighbored computing units.

In a further embodiment, in the step 8, the optimization model is expressed as a formula (3):

$$\min_{X_f, S_f \in \mathbb{R}^{(\Sigma K_m) \times p}} \|X_f\|_* + \alpha \|X_f\|_{GLR} + \beta \|S_f\|_1 \quad (3)$$

$$\text{s.t. } \|O_f - X_f - S_f\|_F^2 \leq \varepsilon, \text{rank}(X_f) \leq r,$$

where m∈ $B_{\widehat{\mathcal{G}}_s}(f,d)$, $K_m$ represents a total number of pixels in the m-th superpixel region, α and β are two parameters, and used to adjust proportions of a nuclear norm, GLR and an $L_1$ norm, $S_f$ represents a model of sparse noise of in the f-th sub-graph, $O_f$ represents hyperspectral image data originally input in the f-th sub-graph, ε represents a threshold value, r is a constant for indicating constraint on a rank of a hyperspectral signal; f represents an integer;

where GLR of signals of one band of the HSI is expressed as a formula (4):

$$\|x\|_{GLR} = x^T L_{\overline{\mathcal{G}_f}} x = \Sigma_{i \sim j} a_{i,j} \cdot (x_i - x_j)^2 \quad (4),$$

the GLR of signals of all bands of the HSI is expressed as a formula (5):

$$\|X\|_{GLR} = Tr(X^T L_{\overline{\mathcal{G}_f}} X) = \|x_1\|_{GLR} + \ldots + \|x_b\|_{GLR} + \ldots \|x_p\|_{GLR} \quad (5),$$

where $L_{\overline{\mathcal{G}_f}}$ represents a Laplacian matrix of the f-th sub-graph, $a_{i,j}$ represents the (i,j)-th element of an adjacency matrix of the f-th sub-graph; $x_i$ represents the i-th graph signal of the f-th sub-graph; $\|x_b\|_{GLR}$ represents a GLR corresponding to the b-th band; and Tr(·) represents a trace of a matrix.

In a further embodiment, in the step 8, the optimization model is obtained according to augmented Lagrange method;

where the formula (3) is equivalently converted into a formula (6):

$$\min_{H_f, X_f, S_f \in \mathbb{R}^{(\Sigma K_m) \times p}} \|H_f\|_* + \alpha \|X_f\|_{GLR} + \beta \|S_f\|_1 \quad (6)$$

$$\text{s.t. } \|O_f - H_f - S_f\|_F^2 \leq \varepsilon, \text{rank}(H_f) \leq r, H_f = X_f,$$

where $H_f$ represents an introduced auxiliary variable, and $H_f = X_f$;

where an augmented Lagrange function of the formula (6) is expressed as a formula (7):

$$\ell(H_f, X_f, S_f, C_f, D_f) = \qquad (7)$$
$$\|H_f\|_* + \alpha\|X_f\|_{GLR} + \beta\|S_f\|_1 + \langle C_f, O_f - H_f - S_f\rangle +$$
$$\langle D_f, X_f - H_f\rangle + \frac{\gamma}{2}\left(\|O_f - H_f - S_f\|_F^2 + \|X_f - H_f\|_F^2\right)$$
$$\text{s.t. } \operatorname{rank}(H_f) \le r,$$

where r represents a penalty variable, which is greater than zero, and $C_f$ and $D_f$ represent Lagrange multipliers; where the formula (7) is alternately optimized through following updatings:

1) updating $H_f$ $$H_f^{(k+1)} = \underset{\operatorname{rank}(H_f)\le r}{\operatorname{argmin}} \ell(H_f, X_f^{(k)}, S_f^{(k)}, C_f^{(k)}, D_f^{(k)}) = \qquad (8)$$
$$\underset{\operatorname{rank}(H_f)\le r}{\operatorname{argmin}} \|H_f\|_* + \langle C_f^{(k)}, O_f - H_f - S_f^{(k)}\rangle +$$
$$\langle D_f^{(k)}, X_f^{(k)} - H_f\rangle + \frac{\gamma}{2}\left(\|O_f - H_f - S_f^{(k)}\|_F^2 + \frac{\gamma}{2}\|X_f^{(k)} - H_f\|_F^2\right)$$
$$= \underset{\operatorname{rank}(H_f)\le r}{\operatorname{argmin}} \|H_f\|_* + \gamma\left\|H_f - \frac{1}{2}\left(O_f + X_f^{(k)} - S_f^{(k)} + \frac{1}{\gamma}(C_f^{(k)} + D_f^{(k)})\right)\right\|_F^2,$$

where (k+1) represents the (k+1)-th iteration, $X_f^{(k)}$ represents the denoised hyperspectral image after the k-th iteration of the f-th sub-graph, $S_f^{(k)}$ represents sparse noise after the k-th iteration of the f-th sub-graph, $C_f^{(k)}$ and $D_f^{(k)}$ represent Lagrange multipliers after the k-th iteration of the f-th sub-graph;

where for a given matrix $Z \in \mathbb{R}^{K\times p}$ with a rank r, singular value decomposition is used to decompose the given matrix, to obtain a formula (9):

$$Z = UE_r V^H, E_r = \operatorname{diag}(\sigma_i) \qquad (9)$$

where $U \in \mathbb{R}^{K\times r}$ and $V \in \mathbb{R}^{p\times r}$ are orthogonal matrices, $E_r$ represents a diagonal matrix composed of singular values, a singular value $\sigma_{i(1\le i\le r)} \ge 0$, a threshold value $\phi$ being greater than or equal to zero is given, and a singular value contraction operator is defined as a formula (10):

$$D_\phi(Z) = U D_\phi(E_r) V^H \qquad (10)$$

$$D_\phi(E_r) = \operatorname{diag}(\max(\eta, 0))$$

where $\eta = \sigma_i - \phi$, $\eta$ represents a vector composed of a difference between the i-th singular value $\sigma_i$ and a threshold value $\phi$, $\sigma_i$ represents the i-th singular value after singular value decomposition, $\phi$ represents a constant, which is the threshold value, $D_\phi(\cdot)$ represents a solution of a singular value contraction operator, the singular value contraction operator (10) is a solution of a problem (11):

$$D_\phi(X) = \underset{\operatorname{rank}(H)\le r}{\operatorname{argmin}} \|H\|_* + \frac{1}{2\phi}\|H - Z\|_F^2. \qquad (11)$$

where the singular value contraction operator (10) is used to optimize a solution of the formula (8) to obtain a formula (12):

$$H_f^{(k+1)} = D_{\frac{1}{2\gamma}}\left(\frac{1}{2}\left(O_f + X_f^{(k)} - S_f^{(k)} + \frac{1}{\gamma}(C_f^{(k)} + D_f^{(k)})\right)\right), \qquad (12)$$

2) updating $X_f$ $$X_f^{(k+1)} = \underset{X}{\operatorname{argmin}} \ell(H_f^{(k+1)}, X_f, S_f^{(k)}, C_f^{(k)}, D_f^{(k)}) \qquad (13)$$
$$= \underset{X_f}{\operatorname{argmin}} \alpha\|X_f\|_{GLR} + \langle D_f^{(k)}, X_f - H_f^{(k+1)}\rangle + \frac{\gamma}{2}\|X_f - H_f^{(k+1)}\|_F^2,$$
$$= \underset{X_f}{\operatorname{argmin}} \alpha\|X_f\|_{GLR} + \frac{\gamma}{2}\left\|X_f - H_f^{(k+1)} + \frac{D_f^{(k)}}{\gamma}\right\|_F^2.$$

where $B_f = H_f^{(k+1)} - D_B^{(k)}/\gamma + [b_1, \ldots, b_p]$, according to the matrix form of GLR in the formula (5), the formula (13) is equivalent to a formula (14):

$$X_f^{(k+1)} = \underset{X_f = [x_1, \cdots, x_p]}{\operatorname{argmin}} \sum_{j=1}^p \left(\alpha\|x_j\|_{GLR} + \frac{\gamma}{2}\|x_j - b_j\|_2^2\right), \qquad (14)$$

where the formula (14) is decomposed into p sub-problems and solved band by band, and the j-th sub-problem of the p sub-problems is expressed as a formula (15):

$$x_j^{(k+1)} = \underset{x_j}{\operatorname{argmin}} \alpha\|x_j\|_{GLR} + \frac{\gamma}{2}\|x_j - b_j\|_2^2 = \alpha x_j^T L_{\overline{G_f}} x_j + \frac{\gamma}{2}\|x_j - b_j\|_2^2. \qquad (15)$$

where the formula (15) is a least squares problem, and a solution of the formula (15) is expressed as a formula (16):

$$x_j^{(k+1)} = (2\alpha L_{\overline{G_f}} + \gamma I)^{-1} \gamma b_j \qquad (16),$$

where a solution of the formula (14) is obtained by combining the solutions (16) of each band and is expressed as a formula (17):

$$[x_1^{(k+1)}, \cdots, x_f^{(k+1)}, \cdots, \qquad (17)$$
$$x_p^{(k+1)}] = \left[(2\alpha L_{\overline{G_f}} + \gamma I)^{-1} \gamma b_1, \cdots, (2\alpha L_{\overline{G_f}} + \gamma I)^{-1} \gamma b_f, \cdots,\right.$$
$$\left.(2\alpha L_{\overline{G_f}} + \gamma I)^{-1} \gamma b_p\right] = (2\alpha L_{\overline{G_F}} + \gamma I)^{-1} [b_1, \cdots, b_f, \cdots, b_p],$$

where the formula (17) is rewritten in matrix form expressed in a formula (18):

$$X_f^{(k+1)} = (2\alpha L_{\overline{G_f}} + \gamma I)^{-1} B_f \qquad (18),$$

where by derivation, the formula (13) is equivalently transformed to a formula (19):

$$X_f^{(k+1)} = \underset{X_f}{\operatorname{argmin}} \alpha\|X_f\|_{GLR} + \frac{\gamma}{2}\left\|X_f - H_f^{(k+1)} + \frac{D_f^{(k)}}{\gamma}\right\|_F^2 \qquad (19)$$
$$= \underset{X_f}{\operatorname{argmin}} \alpha \operatorname{Tr}(X_f^T L_{\overline{G_f}} X_f) + \frac{\gamma}{2}\left\|X_f - H_f^{(k+1)} + \frac{D_f^{(k)}}{\gamma}\right\|_F^2$$
$$= (2\alpha L_{\overline{G_f}} + \gamma I)^{-1}\left(H_f^{(k+1)} - \frac{D_f^{(k)}}{\gamma}\right).$$

3) updating $S_f$ $$S_f^{(k+1)} = \underset{S_f}{\text{argmin}}\, \ell(H_f^{(k+1)}, X_f^{(k+1)}, S_f, C_f^{(k)}, D_f^{(k)}) \quad (20)$$

$$= \underset{S_f}{\text{argmin}}\, \beta\|S_f\|_1 + \langle C_f^{(k)}, O_f - H_f^{(k+1)} - S_f\rangle + \frac{\gamma}{2}\|O_f - H_f^{(k+1)} - S_f\|_F^2,$$

$$= \underset{S_f}{\text{argmin}}\, \beta\|S_f\|_1 + \frac{\gamma}{2}\left\|S_f - \left(O_f - H_f^{(k+1)} + \frac{C_f^{(k)}}{\gamma}\right)\right\|_F^2.$$

where a soft threshold operator is introduced and expressed as a formula (21):

$$R_\Delta(\varphi) = \begin{cases} \varphi - \Delta, & \text{if } \varphi > \Delta \\ \varphi + \Delta, & \text{if } \varphi < \Delta, \\ 0, & \text{otherwise} \end{cases} \quad (21)$$

where $\varphi \in \mathbb{R}$, $\Delta > 0$, and a solution of the formula (20) is expressed as a formula (22):

$$S_f^{(k+1)} = R_{\frac{\beta}{\gamma}}\left(\left(O_f - H_f^{(k+1)} + \frac{C_f^{(k)}}{\gamma}\right)\right), \quad (22)$$

4) updating the Lagrange multipliers $C_f$ and $D_f$, and the penalty variable $\gamma$ $$C_f^{(k+1)} = C_f^{(k)} + \gamma(O_f - H_f^{(k+1)} - S_f^{(k+1)})$$

$$D_f^{(k+1)} = D_f^{(k)} + \gamma(X_f^{(k+1)} - H_f^{(k+1)})$$

$$\gamma^{(k+1)} = \min(\rho\gamma^{(k)}, \gamma_{max}), \quad (23)$$

where $\rho$ represents a growth step, and $\gamma_{max}$ represents a constant.

In a further embodiment, in the step 9, the iterative convergence condition is determined according to a formula (24):

$$\|O_f - H_f^{(k+1)} - S_f^{(k+1)}\|_F / \|O_f\|_F \leq \varepsilon_1 \quad (24)$$

$$\|H_f^{(k+1)} - X_f^{(k+1)}\|_\infty \leq \varepsilon_2,$$

where $\varepsilon_1$ and $\varepsilon_2$ represent two constants, $H_f^{k+1}$ represents introduced auxiliary variable and is a solution of $H_f = X_f$ after (k+1) iterations, $S_f^{(k+1)}$ represents a solution of sparse noise after (k+1) iterations of the f-th sub-graph, and $X_f^{(k+1)}$ represents a solution of a clean hyperspectral image after (k+1) iterations of the f-th sub-graph.

A hyperspectral image distributed restoration system based on graph signal processing and superpixel segmentation is provided according to an embodiment of the present disclosure, including: a memory, a processor, and a computer program stored in the memory and executable by the processor, where the hyperspectral image distributed restoration method based on graph signal processing and superpixel segmentation described above is implemented when the computer program is executed by the processor.

The present disclosure may have at least one of the following beneficial effects.

According to the large-scale hyperspectral image distributed restoration method based on graph signal processing and superpixel segmentation provided by the present disclosure, firstly, the underlying structure of the HSI is modeled by a two-layer architecture graph. The upper layer, called skeleton graph, is a rough graph constructed by using the modified k-nearest-neighborhood algorithm and its nodes correspond to a series of superpixels formed by HSI segmentation. The skeleton graph can efficiently characterize the inter-correlations between superpixels, while preserving the boundary information and reducing the computational complexity. The lower layer, called detailed graph consisting of a series of local graphs which are constructed to model the similarities between pixels. Second, based on the two-layer graph architecture, the HSI restoration problem is formulated as a series of optimization problems each of which resides on a subgraph. In each optimization problem, a graph Laplacian regularization is defined and incorporated into a low-rank-based model. Third, a novel distributed algorithm is tailored for the restoration problem, by using the information interaction between the nodes of skeleton graph and subgraphs. The present method overcomes the problem that hyperspectral images (HSI) are often disturbed by various noises and thus brings great challenges to subsequent applications.

A distributed algorithm based on graph signal processing may serve as a new idea to solve this problem. In the graph signal processing framework, these distributed methods always exchange information with neighbors during each iteration, with a potential to achieve better denoising performance than methods based on non-local or superpixel segmentation. Numerical experiments conducted on both synthetic and real world datasets demonstrate the effectiveness of the proposed restoration algorithm compared with existing methods.

Other advantages, objectives, and features of the present disclosure will be set forth in the following specification to some extent, and will be apparent to those skilled in the art based on the following investigation to some extent, or may be taught from the practice of the present disclosure. The objects and other advantages of the present disclosure can be realized and obtained by the following description.

BRIEF DESCRIPTION OF THE DRAWINGS

In order to make the objectives, the technical solutions and the beneficial effects of the present disclosure clearer, the present disclosure provides the following drawings for illustration.

DETAILED DESCRIPTION OF EMBODIMENTS

The present disclosure is further described hereinafter combined with accompanying drawings and specific embodiments, so that those skilled in the art can better understand the present disclosure and implement the present disclosure, but the specific embodiments hereinafter are not intended to limit the present disclosure.

First Embodiment

Figure 1:
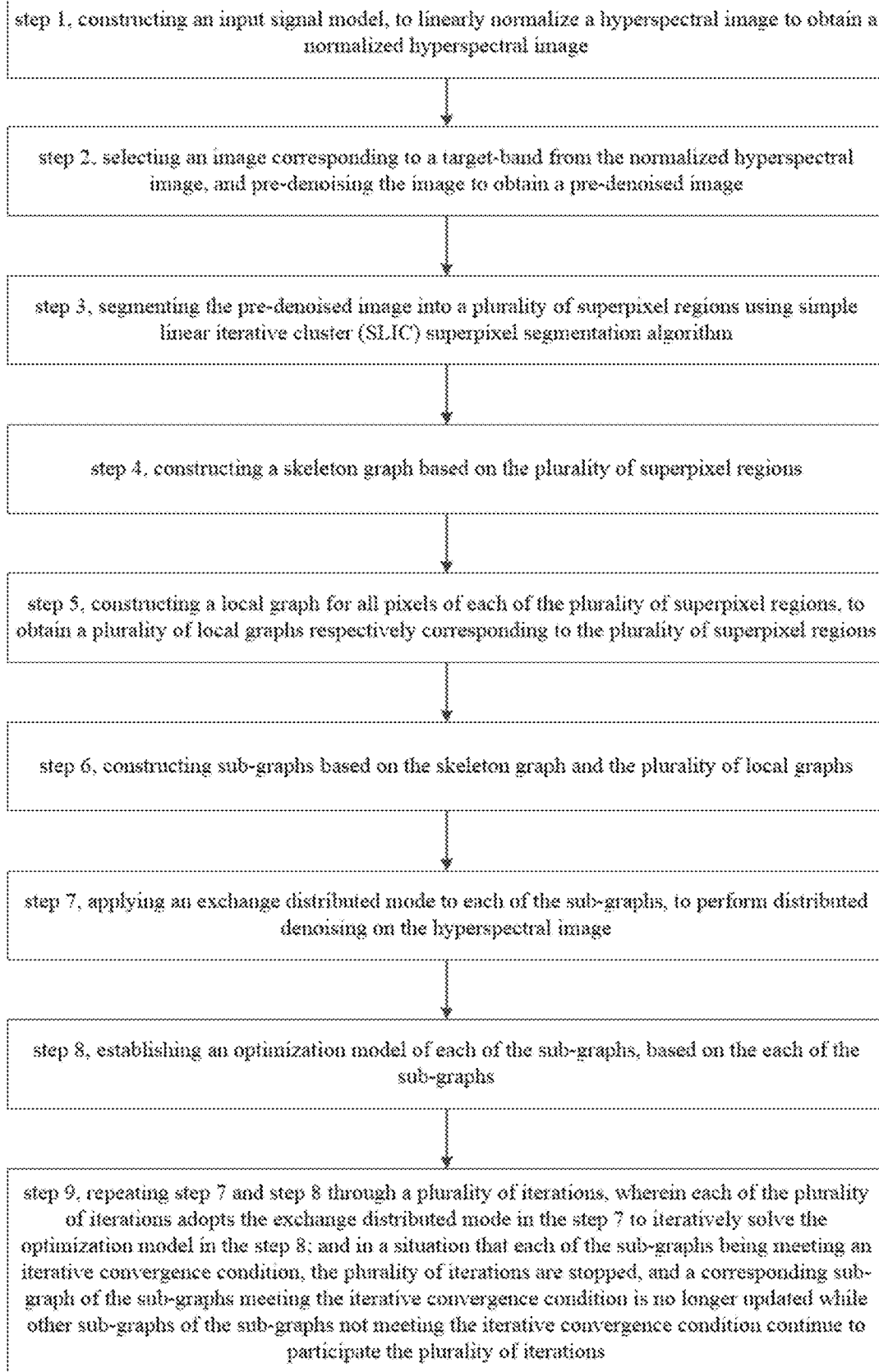
FIG. 1 illustrates a flowchart of a large-scale hyperspectral image distributed restoration method based on graph signal processing and superpixel segmentation according to an embodiment of the present disclosure.

The first embodiment of the present disclosure provides a large-scale HSI distributed restoration method based on graph signal processing and superpixel segmentation. The method may include step 1 through step 9, as shown in FIG. 1.

In step 1, an input signal model is constructed, to linearly normalize an HSI to a range from 0 to 1, to obtain a normalized HSI. The constructed input signal model Y=X+S+N, where Y presents an input noise signal; X represents a clean original image; S represents sparse noise, which may be an impulse noise, a bad dot, a stripe noise; and N represents a Gaussian noise.

In step 2, an image corresponding to a target-band (for example, a specified band or a random band) from the normalized HSI is selected, and the image is pre-denoised using a median filter to obtain a pre-denoised image.

In step 3, the pre-denoised image is segmented into multiple superpixel regions using simple linear iterative cluster (SLIC) superpixel segmentation algorithm.

In step 4, a skeleton graph is constructed based on the multiple superpixel regions. It is assumed that there are $M_s$ superpixel regions after the segmenting. $M_s$ superpixel regions are modeled as $M_s$ skeleton graph nodes respectively. A graph signal of each skeleton graph node is an average value of all pixels in a superpixel region of the multiple superpixel regions corresponding to the skeleton graph node, a coordinate of the skeleton graph node is a coordinate of a target pixel in the superpixel region, and an intensity value of the target pixel is closest to the graph signal. The skeleton graph $\widetilde{G_s}:=(\hat{V}_s, \widetilde{E_s}, \widehat{A_s})$ is constructed based on the multiple skeleton graph nodes using a modified k-Nearest Neighbor (KNN) algorithm, where $\hat{V}_s$ represents a node set composed of the multiple skeleton graph nodes, $\widetilde{E_s}$ represents an edge set composed of edges of the skeleton graph, and $\widehat{A_s}$ represents a skeleton graph adjacency matrix, which is used to describe a correlation weight matrix of the edges of the skeleton graph, and the skeleton graph adjacency matrix $\widehat{A_s}$ is determined by:

determining an initial skeleton graph adjacency matrix based on an element $a_{i,j}$ of the initial skeleton graph adjacency matrix, the element $a_{i,j}$ is expressed as a formula (1):

$$a_{i,j} = \exp\left(-\frac{\|I_i - I_j\|_2^2}{\sigma_1^2}\right)\exp\left(-\frac{\|x_i - x_j\|_2^2}{\sigma_x^2}\right), \quad (1)$$

where $I_i$ represents a coordinate of the i-th superpixel of all pixels of each of the multiple superpixel regions; $I_j$ represents a coordinate of the j-th superpixel of all pixels of each of the multiple superpixel regions; $x_i$ represents a graph signal of the i-th superpixel of all pixels of each of the multiple superpixel regions; $x_j$ represents a graph signal of the j-th superpixel of all pixels of each of the multiple superpixel regions; and $\sigma_1$ and $\sigma_x$ represent two constant parameters; and setting first k relative greater values of each row of the initial skeleton graph adjacency matrix to 1, setting the rest of the row of the initial skeleton graph adjacency matrix to 0, and symmetrizing and modifying the initial skeleton graph adjacency matrix after setting into an unweighted matrix as the skeleton graph adjacency matrix $\widehat{A_s}$.

In step 5, a local graph is constructed for all pixels of each of the multiple superpixel regions, to obtain multiple local graphs respectively corresponding to the multiple superpixel regions. The m-th superpixel region of the multiple superpixel regions has $K_m$ pixels. All pixels of each of the multiple superpixel regions are modeled as pixel nodes, to thereby construct the multiple local graph $\widetilde{G_m}:=\widetilde{V_m}, \widetilde{E_m}$, $\widehat{A_m}$. $\widetilde{V_m}$ represents a node set composed of all pixel nodes in the m-th superpixel region $\widetilde{E_m}$ represents an edge set composed of edges for connecting each pixel node of the all pixel nodes in the m-th superpixel region to surrounding four neighbors of the pixel node, and $\widehat{A_m}$ represents an unweighted four-neighborhood adjacency matrix, which is a sparse matrix. A graph signal of each of the multiple local graphs is a vector $x_m=[x_{m,1}, x_{m,2}, \ldots, x_{m,K_m}]^T \in \mathbb{R}^{K_m}$, a graph signal of an image corresponding to the b-th band of the hyperspectral image is $X_{m,b}=[X_m(1,b), X_m(2,b), \ldots, X_m(K_m,b)]^T \in \mathbb{R}^{K_m}$, $b=1, \ldots, p$, and the local graph is applied to an image corresponding to each band of the hyperspectral image. A matrix is formed based on graph signals of all bands, as a graph signal of the hyperspectral image, expressed as: $X_m=[X_m(i,b)]=[X_{m,1}, \ldots, X_{m,b}, \ldots, X_{m,p}] \in \mathbb{R}^{K_m \times p}$.

$X_m(i, b)$ represents the i-th graph signal of the image corresponding to the b-th band of the hyperspectral image; $X_{m,b}$ represents the m-th graph signal of the image corresponding to the b-th band of the hyperspectral image, and $\mathbb{R}^{K_m \times p}$ represents a dimension $K_m \times p$ of the matrix.

In step 6, sub-graphs are constructed based on the skeleton graph and the multiple local graphs. Since each sub-graph corresponds to one computing node, a hyperspectral restoration problem is transformed into solving of multiple small-scale problems, each sub-graph of the multiple small-scale problems is located on one of the sub-graphs, and each sub-graph is centered on one of the multiple skeleton graph nodes of the skeleton graph. The f-th sub-graph $\overline{G_f}$ of the sub-graphs is expressed as a formula (2):

$$\overline{G_f} := (\overline{V_f}, \overline{E_f}), f=1,2,\ldots,M_s \quad (2).$$

$$\overline{V_f} = \{\widetilde{V_m}\}_{m \in B_{\widetilde{G_s}}(f,d)},$$

$\overline{G_f}$ represents the f-th sub-graph, $\overline{V_f}$ represents a node set composed of all sub-graph nodes of the f-th sub-graph, $\overline{E_f}$ represents an edge set composed of edges between the all sub-graph nodes of the f-th sub-graph, $M_s$ represents of a total number of the sub-graphs, and f represents an integer.

$B_{\widetilde{G_s}}(f,d):=\{j \in \hat{V}_s : \rho(f,j) \leq d\}$ represents a set of neighbor sub-graph nodes of a sub-graph node f of the f-th sub-graph within d hops; $\rho(f,j)$ represents a shortest path (i.e., a quantity of the hopes) from the sub-graph node f to a sub-graph node j. Each sub-graph includes multiple local graphs, the m-th local graph of the at least two of the multiple local graphs is one sub-graph node of the set of neighbor sub-graph nodes of the sub-graph node f corresponding to the f-th sub-graph within the d hops, that is m∈ $B_{\widetilde{G_s}}(f,d)$; where d represents the set of neighbor sub-graph nodes within the d hops, m represents the m-th local graph and is a sub-graph node of the f-th sub-graph, $\widetilde{V_m}$ represents the node set composed of all pixel nodes in the m-th superpixel region of the multiple superpixel regions, $B_{\widehat{\mathcal{G}_s}}$(f, d) represents the set of neighbor sub-graph nodes of the sub-graph node f corresponding to the f-th sub-graph of the skeleton graph $\widehat{\mathcal{G}_s}$ within the d hops.

The edge set $\overline{E_f}$ is obtained by: connecting a boundary node to four neighborhood nodes of the boundary node, and forming an edge between the pixel nodes of a local graph $\widetilde{\mathcal{G}_f}$ and the local graph $\widetilde{\mathcal{G}_m}$, if there is a boundary connection for the local graph $\widetilde{\mathcal{G}_f}$ and the local graph $\widetilde{\mathcal{G}_m}$, in corresponding superpixel regions thereof, or, forming only the edge between the pixel nodes of the local graph $\widetilde{\mathcal{G}_f}$ and the local graph $\widetilde{\mathcal{G}_m}$, if there is no boundary connection for the local graph $\widetilde{\mathcal{G}_f}$ and the local graph $\widetilde{\mathcal{G}_m}$ in corresponding superpixel regions thereof, that is, there is edge connection between the pixel nodes of the local graph $\widetilde{\mathcal{G}_f}$ and the local graph $\widetilde{\mathcal{G}_m}$.

A Laplacian matrix $\overline{L_f}$ of the f-th sub-graph $\overline{\mathcal{G}_f}$ is obtained, and a same sub-graph is applied to all bands of the hyperspectral image corresponding to the sub-graph.

A graph signal of the sub-graph node $v \in \overline{V_f}$ of the f-th sub-graph is mapped into a vector $X_{f,b}=[X_f(1,b),X_f(2,b),\ldots,X_f(\Sigma K_m,b)]^T \in \mathbb{R}\Sigma^{K_m}$, where $m \in B_{\widehat{\mathcal{G}_s}}$(f,d), b=1, ..., p, $X_f$(i,b) represents a graph signal of the i-th sub-graph node corresponding to the b-th band in the f-th sub-graph $\overline{\mathcal{G}_f}$, $X_f$(1, b) represents a graph signal of a first sub-graph node corresponding to the b-th band in the f-th sub-graph $\overline{\mathcal{G}_f}$, $K_m$ represents a total number of pixels in the superpixel region corresponding to the m-th local graph on the f-th sub-graph $\overline{\mathcal{G}_f}$, and b represents the b-th band.

A matrix is formed based on graph signals of all bands using a formula expressed as follows: $X_f=[X_f(i, b)]=[X_{f,1}, \ldots, X_{f,b}, \ldots, X_{f,p}] \in \mathbb{R}^{(\Sigma K_m) \times P}$, $m \in B_{\widehat{\mathcal{G}_s}}$(f,d), and thus the graph signal of the hyperspectral image on the sub-graph $\overline{\mathcal{G}_f}$, f=1, 2, ..., $M_s$ is obtained.

In step 7, a receiving-transmitting-fusing (also referred to as exchange) distributed mode is applied to each of the sub-graphs, to perform distributed denoising on the HSI. It is assumed that there are $M_s$ computing units, each computing unit corresponds to one of the multiple local graphs $\overline{\mathcal{G}_f}$, and a transmission link with neighbored computing units of the computing unit is established by the computing unit based on edges of the skeleton graph $\overline{\mathcal{G}_f}$.

$M_s$ computing units perform following steps during each iteration of the optimization model of each of the sub-graphs: receiving computing results from the neighbored computing units when each of multiple iterations is performed; fusing and averaging, by the computing unit, the received computing results from the neighbored computing units with a last calculation result of the computing unit; determining, by the computing unit, an optimized computing result of the computing unit and optimized computing results of the neighbored computing units based on the optimization model of each of the sub-graphs; and transmitting, by the computing unit, the optimized computing result of the computing unit and a corresponding one of the optimized computing results of the neighbored computing units to a corresponding one of the neighbored computing units. The above steps are repeated for iteration solving of the optimization model of each of the sub-graphs.

In step 8, an optimization model of each of the sub-graphs is established based on the each of the sub-graphs; the optimization model is expressed as a formula (3):

$$\min_{X_f, S_f \in \mathbb{R}(\Sigma K_m) \times p} \|X_f\|_* + \alpha \|X_f\|_{GLR} + \beta \|S_f\|_1 \quad (3)$$

$$\text{s.t. } \|O_f - X_f - S_f\|_F^2 \le \varepsilon, \text{rank}(X_f) \le r.$$

$m \in B_{\widehat{\mathcal{G}_s}}$(f,d), $K_m$ represents a total number of pixels in the m-th superpixel region, $\alpha$ and $\beta$ are two parameters, and used to adjust proportions of a kernel norm, GLR and an $L_1$ norm, $S_f$ represents a model of sparse noise of in the f-th sub-graph, $O_f$ represents hyperspectral image data originally input in the f-th sub-graph, $\varepsilon$ represents a threshold value, r is a constant for indicating constraint on a rank of a hyperspectral signal; f represents an integer.

GLR of Signals of One Band of the HSI is Expressed as a Formula (4):

$$\|x\|_{GLR} = x^T L_{\overline{\mathcal{G}_f}} x = \Sigma_{i \sim j} a_{i,j} (x_i - x_j)^2 \quad (4).$$

The GLR of Signals of all Bands of the HSI is Expressed as a Formula (5):

$$\|X\|_{GLR} = Tr(X^T L_{\overline{\mathcal{G}_f}} X) = \|x_1\|_{GLR} + \ldots + \|x_b\|_{GLR} + \ldots \|x_p\|_{GLR} \quad (5).$$

Therefore, it can be regarded as the combination vector form of GLR. GLR is a quadratic form of matrix, which has many excellent characteristics. A solution of quadratic problem can be solved by simple standard linear algebra. In addition, because of the rank constraint in the optimization model, the formula (3) is non-convex, and the augmented Lagrange multiplier method (ALM) can be used to solve this problem.

$L_{\overline{\mathcal{G}_f}}$ represents a Laplacian matrix of the f-th sub-graph, $a_{i,j}$ represents the (i,j)-th element of an adjacency matrix of the f-th sub-graph; $x_i$ represents the i-th graph signal of the f-th sub-graph; $\|x_b\|_{GLR}$ represents a GLR corresponding to the b-th band; and Tr(·) represents a trace of a matrix.

The formula (3) is equivalently converted into a formula (6):

$$\min_{H_f, X_f, S_f \in \mathbb{R}(\Sigma K_m) \times p} \|H_f\|_* + \alpha \|X_f\|_{GLR} + \beta \|S_f\|_1 \quad (6)$$

$$\text{s.t. } \|O_f - H_f - S_f\|_F^2 \le \varepsilon, \text{rank}(H_f) \le r, H_f = X_f,$$

where $H_f$ represents an introduced auxiliary variable, and $H_f = X_f$.

An augmented Lagrange function of the formula (6) is expressed as a formula (7):

$$\ell(H_f, X_f, S_f, C_f, D_f) = \quad (7)$$
$$\|H_f\|_* + \alpha \|X_f\|_{GLR} + \beta \|S_f\|_1 + \langle C_f, O_f - H_f - S_f \rangle +$$
$$\langle D_f, X_f - H_f \rangle + \frac{\gamma}{2} \left( \|O_f - H_f - S_f\|_F^2 + \|X_f - H_f\|_F^2 \right)$$

-continued s.t.

rank $(H_f) \le r$, where r represents a penalty variable, which is greater than zero, and $C_f$ and $D_f$ represent Lagrange multipliers. When the formula (7) is alternately optimized, one variable can be optimized while other variables are remain unchanged.

The formula (7) is alternately optimized through following updatings:

1) Updating $H_f$ $$H_f^{(k+1)} = \underset{rank(H_f) \le r}{\operatorname{argmin}} \ell(H_f, X_f^{(k)}, S_f^{(k)}, C_f^{(k)}, D_f^{(k)}) = \qquad (8)$$

$$\underset{rank(H_f) \le r}{\operatorname{argmin}} \|H_f\|_* + \langle C_f^{(k)}, O_f - H_f - S_f^{(k)} \rangle + \langle D_f^{(k)}, X_f^{(k)} - H_f \rangle +$$

$$\frac{\gamma}{2}(\|O_f - H_f - S_f^{(k)}\|_F^2 + \frac{\gamma}{2}\|X_f^{(k)} - H_f\|_F^2) = \underset{rank(H_f) \le r}{\operatorname{argmin}} \|H_f\|_* +$$

$$\gamma \left\| H_f - \frac{1}{2}\left(O_f + X_f^{(k)} - S_f^{(k)} + \frac{1}{\gamma}(C_f^{(k)} + D_f^{(k)})\right) \right\|_F^2,$$

(k+1) represents a (k+1)-th iteration, $X_f^{(k)}$ represents the denoised hyperspectral image after the k-th iteration of the f-th sub-graph, $S_f^{(k)}$ represents sparse noise after the k-th iteration of the f-th sub-graph, $C_f^{(k)}$ and $D_f^{(k)}$ represent Lagrange multipliers after the k-th iteration of the f-th sub-graph.

For a given matrix $Z \in \mathbb{R}^{K \times p}$ with a rank r, singular value decomposition is used to decompose the given matrix, to obtain a formula (9):

$$Z = UE_r V^H, E_r = \operatorname{diag}(\sigma_i) \qquad (9),$$

$U \in \mathbb{R}^{K \times r}$ and $V \in \mathbb{R}^{p \times r}$ are orthogonal matrices, $E_r$ represents a diagonal matrix composed of singular values, a singular value $\sigma_{i(1 \le i \le r)} \ge 0$, a threshold value $\phi$ being greater than or equal to zero is given, and a singular value threshold value (also referred to a singular value contraction) operator is defined as a formula (10):

$$D_\phi(Z) = U D_\phi(E_r) V^H \qquad (10)$$

$$D_\phi(E_r) = \operatorname{diag}(\max(\eta, 0)),$$

$\eta = \sigma_i - \phi$, $\eta$ represents a vector composed of a difference between an i-th singular value $\sigma_i$ and a threshold value $\phi$, $\sigma_i$ represents the i-th singular value after singular value decomposition, $\phi$ represents a constant, which is the threshold value, $D_\phi(\cdot)$ represents a solution of a singular value contraction operator, the singular value contraction operator (10) is a solution of a problem (11):

$$D_\phi(Z) = \underset{rank(H_f) \le r}{\operatorname{argmin}} \|H\|_* + \frac{1}{2\phi}\|H - Z\|_F^2, \qquad (11)$$

The singular value contraction operator (10) is used to optimize a solution of the formula (8) to obtain a formula (12):

$$H_f^{(k+1)} = D_{\frac{1}{2\gamma}}\left(\frac{1}{2}\left(O_f + X_f^{(k)} - S_f^{(k)} + \frac{1}{\gamma}(C_f^{(k)} + D_f^{(k)})\right)\right), \qquad (12)$$

2) Updating $X_f$ $$X_f^{(k+1)} = \underset{X_f}{\operatorname{argmin}} \ell(H_f^{(k+1)}, X_f, S_f^{(k)}, C_f^{(k)}, D_f^{(k)}) = \qquad (13)$$

$$\underset{X_f}{\operatorname{argmin}} \alpha \|X_f\|_{GLR} + \langle D_f^{(k)}, X_f - H_f^{(k+1)} \rangle + \frac{\gamma}{2}\|X_f - H_f^{(k+1)}\|_F^2 =$$

$$\underset{X_f}{\operatorname{argmin}} \alpha \|X_f\|_{GLR} + \frac{\gamma}{2}\left\|X_f - H_f^{(k+1)} + \frac{D_f^{(k)}}{\gamma}\right\|_F^2,$$

For convenience, $B_f = H_f^{(k+1)} - D_B^{(k)}/\gamma + [b_1, \ldots, b_p]$, and according to the matrix form of GLR in the formula (5), the formula (13) is equivalent to a formula (14):

$$X_f^{(k+1)} = \underset{X_f = [x_1, \cdots, x_p]}{\operatorname{argmin}} \sum_{j=1}^{p} \left(\alpha \|x_j\|_{GLR} + \frac{\gamma}{2}\|x_j - b_j\|_2^2\right), \qquad (14)$$

Then, the formula (14) is decomposed into p sub-problems and solved band by band, and the j-th sub-problem of the p sub-problems is expressed as a formula (15):

$$x_j^{(k+1)} = \underset{x_j}{\operatorname{argmin}} \alpha \|x_j\|_{GLR} + \frac{\gamma}{2}\left(\|x_j - b_j\|_2^2 = \alpha x_j^T L_{\overline{\mathcal{G}_f}} x_j + \frac{\gamma}{2}\|x_j - b_j\|_2^2, \qquad (15)$$

The formula (15) is a least squares problem, and a solution of the formula (15) is expressed as a formula (16):

$$x_j^{(k+1)} = (2\alpha L_{\overline{\mathcal{G}_f}} + \gamma I)^{-1} \gamma b_j \qquad (16).$$

Therefore, a solution of the formula (14) can be obtained by combining the solutions (16) of each band and is expressed as a formula (17):

$$\left[x_1^{(k+1)}, \cdots, x_f^{(k+1)}, \cdots, \right. \qquad (17)$$

$$\left. x_p^{(k+1)}\right] = \left[\left(2\alpha L_{\overline{\mathcal{G}_f}} + \gamma I\right)^{-1} \gamma b_1, \cdots, \left(2\alpha L_{\overline{\mathcal{G}_f}} + \gamma I\right)^{-1} \gamma b_f, \cdots, \right.$$

$$\left. \left(2\alpha L_{\overline{\mathcal{G}_f}} + \gamma I\right)^{-1} \gamma b_p\right] = \left(2\alpha L_{\overline{\mathcal{G}_f}} + \gamma I\right)^{-1} [b_1, \cdots, b_f, \cdots, b_p],$$

It is apparent that the formula (17) can be rewritten in matrix form expressed in a formula (18):

$$X_f^{(k+1)}(2\alpha L_{\overline{\mathcal{G}_f}} + \gamma)^{-1} B_f \qquad (18).$$

By derivation, the formula (13) is equivalently transformed to a formula (19):

$$X_f^{(k+1)} = \underset{X_f}{\operatorname{argmin}} \alpha \|X_f\|_{GLR} + \frac{\gamma}{2}\left\|X_f - H_f^{(k+1)} + \frac{D_f^{(k)}}{\gamma}\right\|_F^2 = \qquad (19)$$

$$\underset{X_f}{\operatorname{argmin}} \alpha Tr\left(X_f^T L_{\overline{\mathcal{G}_f}} X_f\right) + \frac{\gamma}{2}\left\|X_f - H_f^{(k+1)} + \frac{D_f^{(k)}}{\gamma}\right\|_F^2 =$$

$$\left(2\alpha L_{\overline{\mathcal{G}_f}} + \gamma I\right)^{-1}\left(H_f^{(k+1)} - \frac{D_f^{(k)}}{\gamma}\right),$$

3) Updating $S_f$ $$S_f^{(k+1)} = \operatorname*{argmin}_{S_f} \ell(H_f^{(k+1)}, X_f^{(k+1)}, S_f, C_f^{(k)}, D_f^{(k)}) = \qquad (20)$$

$$\operatorname*{argmin}_{S_f} \beta \|S_f\|_1 + \langle C_f^{(k)}, O_f - H_f^{(k+1)} - S_f \rangle + \frac{\gamma}{2} \|O_f - H_f^{(k+1)} - S_f\|_F^2 =$$

$$\operatorname*{argmin}_{S_f} \beta \|S_f\|_1 + \frac{\gamma}{2} \left\| S_f - \left( O_f - H_f^{(k+1)} + \frac{C_f^{(k)}}{\gamma} \right) \right\|_F^2,$$

A soft threshold operator is introduced and expressed as a formula (21):

$$R_\Delta(\varphi) = \begin{cases} \varphi - \Delta, & \text{if } \varphi > \Delta \\ \varphi + \Delta, & \text{if } \varphi < \Delta, \\ 0, & \text{otherwise} \end{cases} \qquad (21)$$

where $\varphi \in \mathbb{R}$, $\Delta > 0$, and a solution of the formula (20) is expressed as a formula (22):

$$S_f^{(k+1)} = R_{\frac{\beta}{\gamma}}\left( \left( O_f - H_f^{(k+1)} + \frac{C_f^{(k)}}{\gamma} \right) \right), \qquad (22)$$

4) Updating the Lagrange Multipliers $C_f$ and $D_f$, and the Penalty Variable $\gamma$ $$C_f^{(k+1)} = C_f^{(k)} + \gamma(O_f - H_f^{(k+1)} - S_f^{(k+1)})$$

$$D_f^{(k+1)} = D_f^{(k)} + \gamma(X_f^{(k+1)} - H_f^{(k+1)})$$

$$\gamma^{(k+1)} = \min(\rho\gamma^{(k)}, \gamma_{max}), \qquad (23)$$

where $\rho$ represents a growth step, and $\gamma_{max}$ represents a constant.

In step 9, the step 7 and the step 8 are repeated through multiple iterations, where each of the multiple iterations adopts the receiving-transmitting-fusing distributed mode in the step 7 to iteratively solve the optimization model in the step 8; and in a situation that each of the sub-graphs being meeting an iterative convergence condition, the repeating is stopped, and a corresponding sub-graph of the sub-graphs meeting the iterative convergence condition is no longer updated while other sub-graphs of the sub-graphs not meeting the iterative convergence condition continue to participate the repeating. The iterative convergence condition is determined according to a formula (24):

$$\|O_f - H_f^{(k+1)} - S_f^{(k+1)}\|_F / \|O_f\|_F \leq \varepsilon_1 \qquad (24)$$

$$\|H_f^{(k+1)} - X_f^{(k+1)}\|_\infty \leq \varepsilon_2,$$

where $\varepsilon_1$ and $\varepsilon_2$ represent two constants, $H_f^{(k+1)}$ represents introduced auxiliary variable and is a solution of $H_f = X_f$ after (k+1) iterations, $S_f^{(k+1)}$ represents a solution of sparse noise after (k+1) iterations of the f-th sub-graph, and $X_f^{(k+1)}$ represents a solution of a clean hyperspectral image after (k+1) iterations of the f-th sub-graph.

Further, a hyperspectral image distributed restoration system based on graph signal processing and superpixel segmentation is provided according to an embodiment of the present disclosure, including: a memory, a processor, and a computer program stored in the memory and executable by the processor, where the hyperspectral image distributed restoration method based on graph signal processing and superpixel segmentation described above is implemented when the computer program is executed by the processor.

Second Embodiment

In the second embodiment, the input hyperspectral image is a clean hyperspectral image of a Washington Shopping Center, namely X, which has 191 bands and a dimension thereof is 1280×307×191. Noises are added artificially, and the added noises include parse noise (including a salt and pepper noise and a deadline noise) and a Gaussian noise. An output after noise addition is Y A three-dimensional (3D) hyperspectral image after noise addition is input into the model of this method of the present disclosure to obtain the denoised hyperspectral image.

In this embodiment, parameters of the specific steps are set as follows. In the step (2), a specific hyperspectral band set is selected, and hyperspectral data of the 50-th band is taken; and a window adopted by the median filtering is [3, 3]. For parameters of the SLIC superpixel segmentation in the step (3), a size of the regions is set to 30, and a regularization parameter is set to 0.05. In the step (4), $\sigma_1=100$, $\sigma_x=0.2$, and k=3. In the step (6), d=1. In the step (8), $\alpha=0.5$, $\beta=0.23$, $\varepsilon=\varepsilon_1=\varepsilon_2=1e-6$, r=3, $\rho=1.5$, $\gamma_{max}=1e6$, each of $H_f^{(0)}$, $X_f^{(0)}$, $S_f^{(0)}$, $C_f^{(0)}$, $D_f^{(0)}$ is an all-zero matrix, and $\gamma^{(0)}=1e-2$. Finally, a peak signal-to-noise ratio (PSNR) and a structural similarity (SSIM) parameters of the denoised hyperspectral image X and the clean image without adding noise are calculated to evaluate the superiority of the denoised effect.

Figure 2:
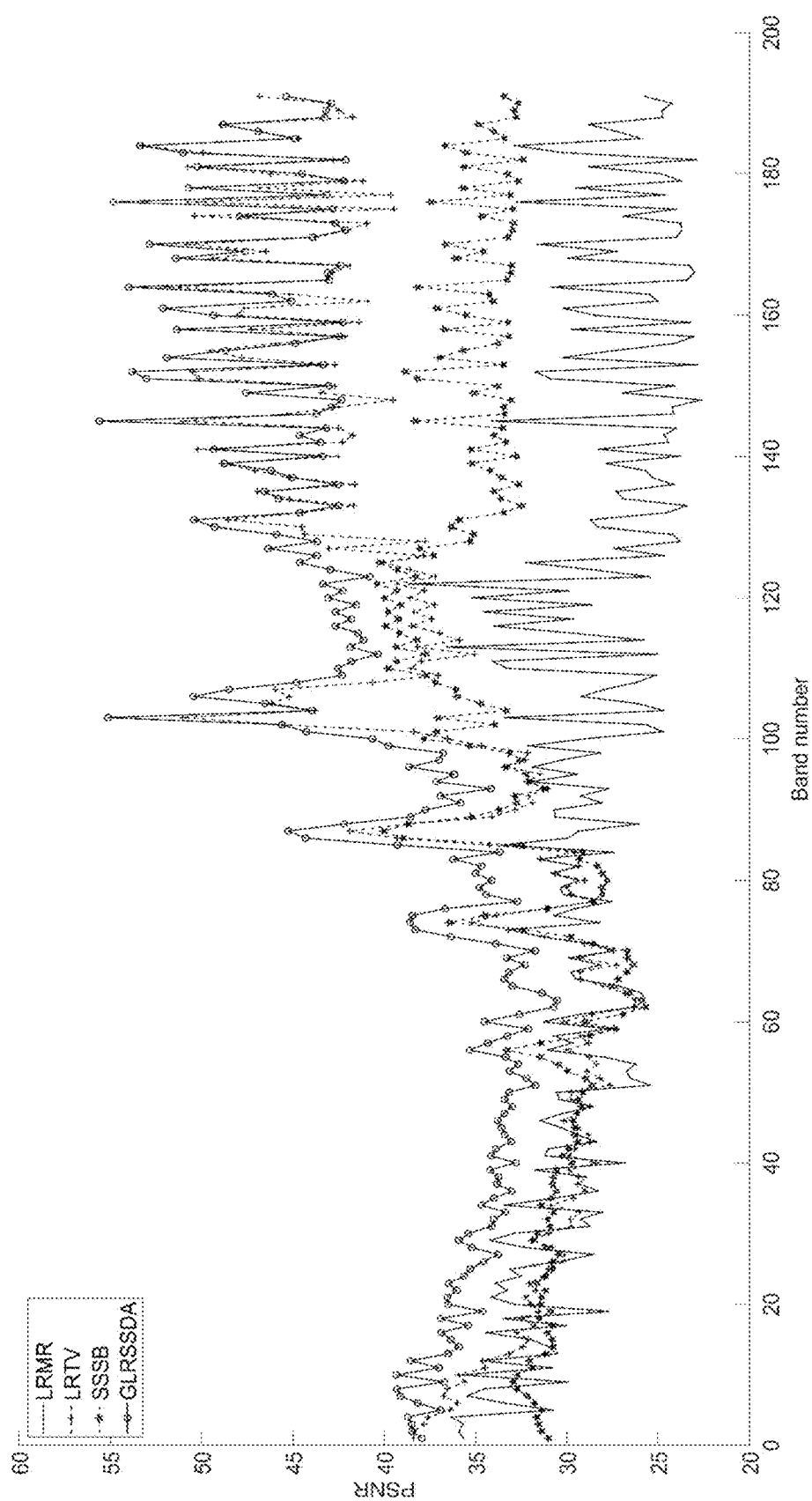
FIG. 2 illustrates a comparison view of peak signal to noise ratios (PSNR) of each band according to an embodiment of the present disclosure.
Figure 3:
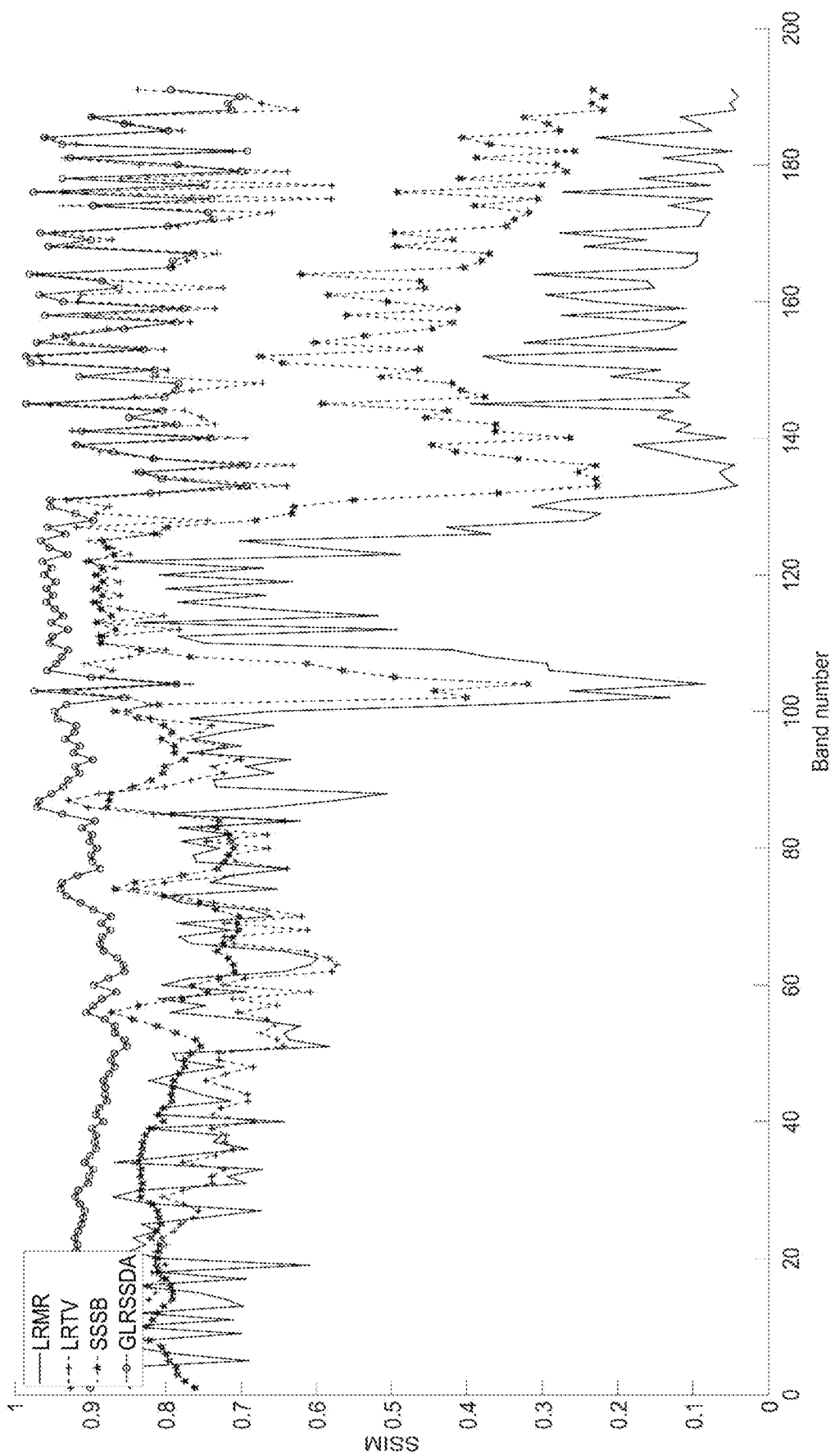
FIG. 3 illustrates a comparison view of structural similarities (SSIM) of each band according to an embodiment of the present disclosure.
Figure 4:
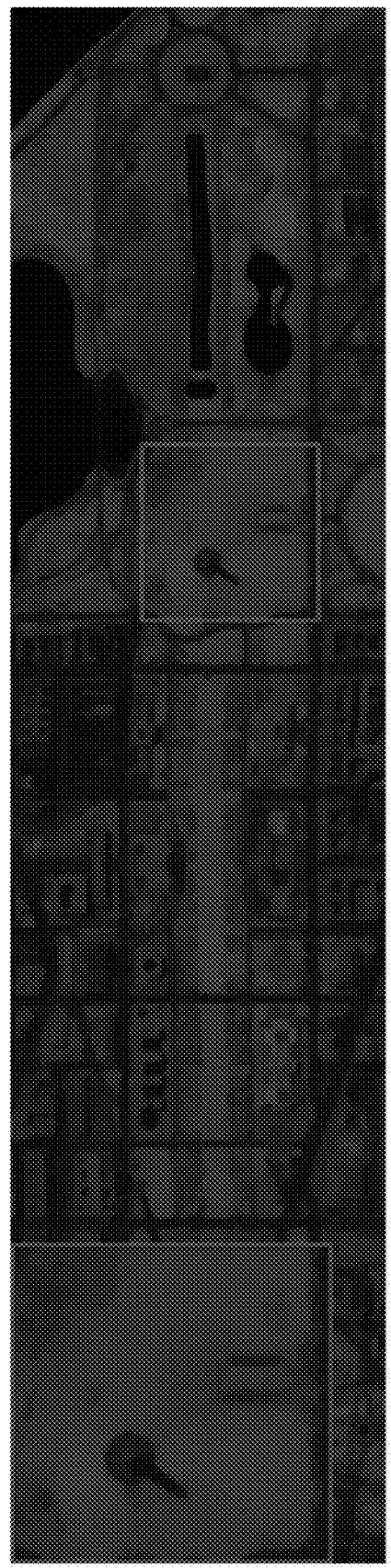
Figure 5:
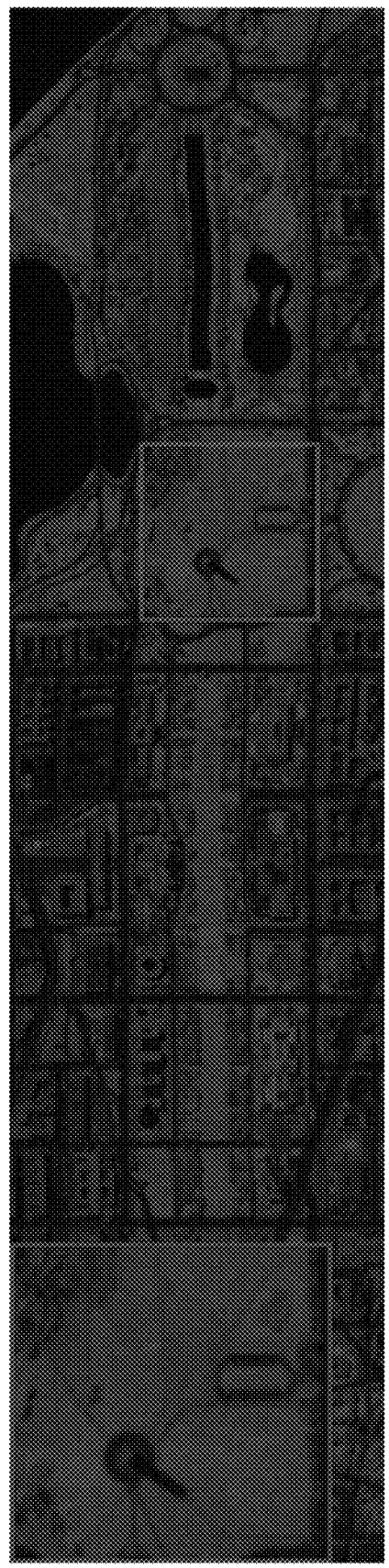
Figure 6:
Figure 7:
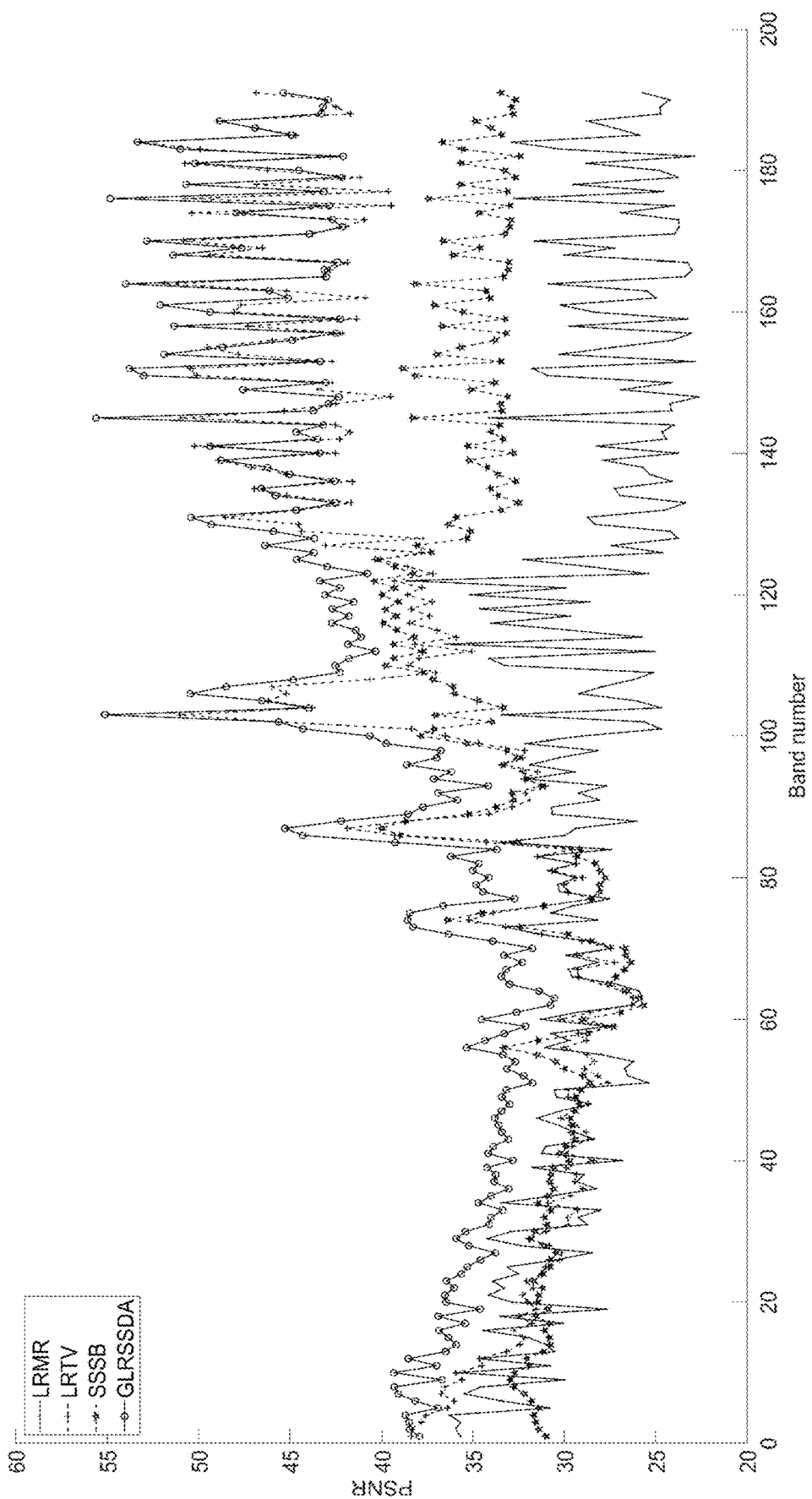
Figure 8:
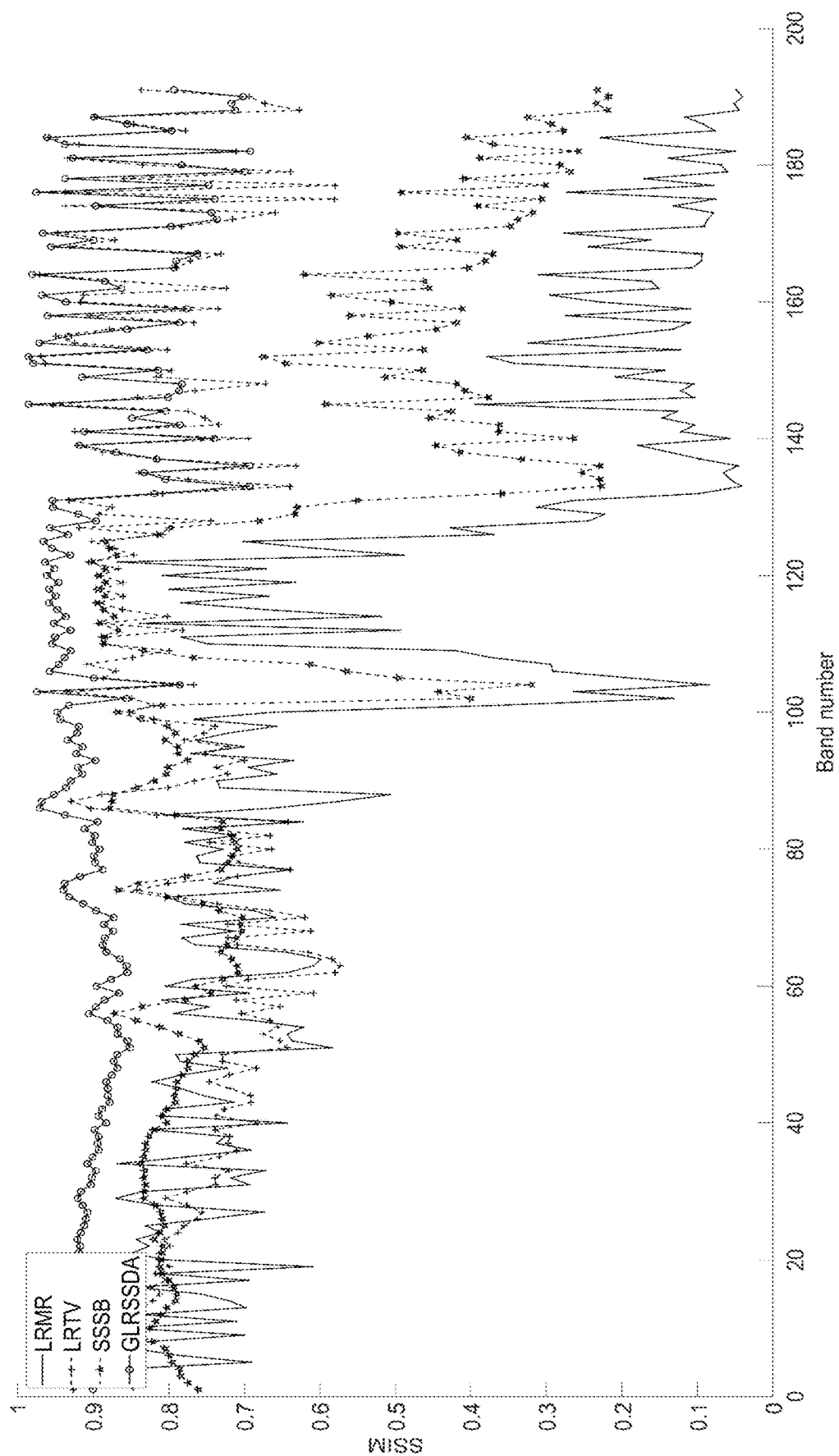

The denoised 3D hyperspectral image is input into the technical solution model with set parameters of the present disclosure. The solution graph signal processing and superpixel segmentation (GLRSSDA) is compared with a hyperspectral image restoration method based on low-rank matrix recovery (LRMR) proposed by Hongyan Zhang, the hyperspectral image restoration method based on total-variation-regularized low-rank matrix factorization (LRTV) proposed by Wei He and the hyperspectral image restoration method based on superpixel segmentation of smooth band (SSSB) proposed by Yaru Fan, and the comparison graphs before and after denoising are obtained (not shown). Comparing the PSNR and SSIM parameters of each band after denoising in the technical solution of the present disclosure with the solutions of the above-mentioned prior art, FIGS. 2 and 3 are obtained. It can be seen from the two drawings that the circled solid line in the drawings represents a curve of the GLRSSDA of the technical solution of the present disclosure, the solid line with '·' represents a curve of the LRMR, the dotted line with '+' represents a curve of the LRMR, and the dotted line with a five-pointed star represents a curve of the SSSB. There is a footnote corresponding to the line type and technical solution in an upper left of each of the two drawings. The higher the PSNR and SSIM, the better the denoising effect. From FIGS. 2 and 3, it can be observed that the denoising effect of PSNR and SSIM in the technical solution of the present disclosure is better than that of LRMR, LRTV and SSSB in most bands.

In summary, it can be observed that the technical solution of the present disclosure is superior to the technical solutions of the above-mentioned prior arts. The PSNR and SSIM of each band in the technical solution of the present disclosure and the above-mentioned existing solution are averaged to obtain MPSNR and MSSIM indexes, to obtain results shown in a table 1 below, and it can be observed that the technical solution of the present disclosure is superior to the above-mentioned existing solutions.

TABLE 1

Comparison table of denoising effect of different methods

| Comparison of denoising effect | | Denoising method | | | |
|---|---|---|---|---|---|
| | | LRMR | LRTV | SSSB | GLRSSDA |
| Parameter | MPSNR | 28.93 | 37.30 | 33.09 | 40.38 |
| | MSSIM | 0.5131 | 0.7905 | 0.6615 | 0.8893 |

The large-scale hyperspectral image distributed restoration method based on graph signal processing and superpixel segmentation provided by the embodiment of the present disclosure overcomes the problem that hyperspectral images (HSI) are often disturbed by various noises.

The above-mentioned embodiments are merely preferred embodiments for fully explaining the present disclosure, and the scope of protection of the present disclosure is not limited thereto. Equivalent substitutions or changes made by those skilled in the art on the basis of the present disclosure are within the scope of protection of the present disclosure. The scope of protection of the disclosure is subject to the claims.

What is claimed is:

1. A hyperspectral image distributed restoration method based on graph signal processing and superpixel segmentation, comprising:

step 1, constructing an input signal model, to linearly normalize a hyperspectral image to obtain a normalized hyperspectral image;

step 2, selecting an image corresponding to a target-band from the normalized hyperspectral image, and pre-denoising the image to obtain a pre-denoised image;

step 3, segmenting the pre-denoised image into a plurality of superpixel regions using simple linear iterative cluster (SLIC) superpixel segmentation algorithm;

step 4, constructing a skeleton graph based on the plurality of superpixel regions;

step 5, constructing a local graph for all pixels of each of the plurality of superpixel regions, to obtain a plurality of local graphs respectively corresponding to the plurality of superpixel regions;

step 6, constructing sub-graphs based on the skeleton graph and the plurality of local graphs;

step 7, applying an exchange distributed mode to each of the sub-graphs, to perform distributed denoising on the hyperspectral image;

step 8, establishing an optimization model of each of the sub-graphs, based on the each of the sub-graphs; and step 9, repeating step 7 and step 8 through a plurality of iterations, wherein each of the plurality of iterations adopts the exchange distributed mode in the step 7 to iteratively solve the optimization model in the step 8; and in a situation that each of the sub-graphs being meeting an iterative convergence condition, the plurality of iterations are stopped, and a corresponding sub-graph of the sub-graphs meeting the iterative convergence condition is no longer updated while other sub-graphs of the sub-graphs not meeting the iterative convergence condition continue to participate the plurality of iterations.

2. The hyperspectral image distributed restoration method based on graph signal processing and superpixel segmentation according to claim 1, wherein in the step 4, the constructing the skeleton graph based on the plurality of superpixel regions, comprises:

modeling the plurality of superpixel regions as a plurality of skeleton graph nodes respectively, wherein a graph signal of each skeleton graph node of the plurality of skeleton graph nodes is an average value values of all pixels in a superpixel region of the plurality of superpixel regions corresponding to the skeleton graph node, a coordinate of the skeleton graph node is a coordinate of a center pixel of the all pixels whose intensity is closest to the graph signal; and constructing the skeleton graph $\widetilde{\mathcal{G}_s}:=(\hat{V}_s, \widetilde{E_s}, \widehat{A_s})$ based on the plurality of skeleton graph nodes using a modified k-Nearest Neighbor (KNN) algorithm, where $\hat{V}_s$ represents a node set composed of the plurality of skeleton graph nodes, $\widetilde{E_s}$ represents an edge set composed of edges of the skeleton graph, and $\widehat{A_s}$ represents a skeleton graph adjacency matrix, which is used to describe a correlation weight matrix of the edges of the skeleton graph, wherein the skeleton graph adjacency matrix $\widehat{A_s}$ is determined by:

determining an initial skeleton graph adjacency matrix based on an element $a_{i,j}$ of the initial skeleton graph adjacency matrix, the element $a_{i,j}$ is expressed as a formula (1):

$$a_{i,j} = \exp\left(-\frac{\|I_i - I_j\|_2^2}{\sigma_1^2}\right) \exp\left(-\frac{\|x_i - x_j\|_2^2}{\sigma_x^2}\right), \quad (1)$$

where $I_i$ represents a coordinate of the i-th superpixel of all pixels of each of the plurality of superpixel regions; $I_j$ represents a coordinate of the j-th superpixel of all pixels of each of the plurality of superpixel regions; $x_i$ represents a graph signal of the i-th superpixel of all pixels of each of the plurality of superpixel regions; $x_j$ represents a graph signal of the j-th superpixel of all pixels of each of the plurality of superpixel regions; and $\sigma_1$ and $\sigma_x$ represent two constant parameters; and setting first k relative greater values of each row of the initial skeleton graph adjacency matrix to 1, setting the rest of the row of the initial skeleton graph adjacency matrix to 0, and symmetrizing and modifying the initial skeleton graph adjacency matrix after setting into an unweighted matrix as the skeleton graph adjacency matrix $\widehat{A_s}$.

3. The hyperspectral image distributed restoration method based on graph signal processing and superpixel segmentation according to claim 1, wherein in the step 5, the m-th superpixel region of the plurality of superpixel regions has $K_m$ pixels, and the constructing the local graph for all pixels of each of the plurality of superpixel regions, to obtain the plurality of local graphs respectively corresponding to the plurality of superpixel regions, comprises:

modeling all pixels of each of the plurality of superpixel regions as pixel nodes, to thereby construct the plurality of local graph $\widetilde{\mathcal{G}_m} := \widetilde{V_m}, \widetilde{E_m}, \widetilde{A_m}$ ), wherein $\widetilde{V_m}$ represents a node set composed of all pixel nodes in the m-th superpixel region, $\widetilde{E_m}$ represents an edge set composed of edges for connecting each pixel node of the all pixel nodes in the m-th superpixel region to surrounding four neighbors of the pixel node, and $\widetilde{A_m}$ represents an unweighted four-neighborhood adjacency matrix;

wherein a graph signal of each of the plurality of local graphs is a vector $x_m=[x_{m,1}, x_{m,2}, \ldots, x_{m,K_m}]^T \in \mathbb{R}^{K_m}$, a graph signal of an image corresponding to the b-th band of the hyperspectral image is $X_{m,b}=[X_m(1, b), X_m(2, b), \ldots, X_m(K_m, b)]^T \in \mathbb{R}^{K_m}$, $b=1, \ldots, p$, and the local graph is applied to an image corresponding to each band of the hyperspectral image;

wherein a matrix is formed based on graph signals of all bands, as a graph signal of the hyperspectral image, expressed as: $X_m=[X_m(i, b)]=[X_{m,1}, \ldots, X_{m,b}, \ldots, X_{m,p}] \in \mathbb{R}^{K_m \times p}$, where $X_m(i, b)$ represents the i-th graph signal of the image corresponding to the b-th band of the hyperspectral image; $X_{m,b}$ represents the m-th graph signal of the image corresponding to the b-th band of the hyperspectral image, and $\mathbb{R}^{K_m \times p}$ represents a dimension $K_m \times p$ of the matrix.

4. The hyperspectral image distributed restoration method based on graph signal processing and superpixel segmentation according to claim 3, wherein in the step 6, a hyperspectral restoration problem is transformed into solving of a plurality of small-scale problems, each sub-graph of the plurality of small-scale problems is located on one of the sub-graphs, and each sub-graph is centered on one of the plurality of skeleton graph nodes of the skeleton graph;

wherein the f-th sub-graph $\overline{\mathcal{G}_f}$ of the sub-graphs is expressed as a formula (2):

$$\overline{\mathcal{G}_f} := (\overline{V_f}, \overline{E_f}), f=1,2,\ldots,M_s \qquad (2)$$

where $$\overline{V_f} = \{\widetilde{V_m}\}_{m \in B_{\widehat{\mathcal{G}_s}}(f,d)},$$

$\overline{\mathcal{G}_f}$ represents the f-th sub-graph, $\overline{V_f}$ represents a node set composed of all sub-graph nodes of the f-th sub-graph, $\overline{E_f}$ represents an edge set composed of edges between the all sub-graph nodes of the f-th sub-graph, $M_s$ represents of a total number of the sub-graphs, and f represents an integer;

wherein $B_{\widehat{\mathcal{G}_s}}(f,d):=\{j \in \hat{V}_s : \rho(f,j) \leq d\}$ represents a set of neighbor sub-graph nodes of a sub-graph node f of the f-th sub-graph within d hops;

wherein $\rho(f,j)$ represents a shortest path from the sub-graph node f to a sub-graph node j;

wherein each sub-graph comprises at least two of the plurality of local graphs, the m-th local graph of the at least two of the plurality of local graphs is one sub-graph node of the set of neighbor sub-graph nodes of the sub-graph node f corresponding to the f-th sub-graph within the d hops, that is $m \in B_{\widehat{\mathcal{G}_s}}(f,d)$;

wherein d represents the set of neighbor sub-graph nodes within the d hops, m represents the m-th local graph and is a sub-graph node of the f-th sub-graph, $\widetilde{V_m}$ represents the node set composed of all pixel nodes in the m-th superpixel region of the plurality of superpixel regions, $B_{\widehat{\mathcal{G}_s}}(f,d)$ represents the set of neighbor sub-graph nodes of the sub-graph node f corresponding to the f-th sub-graph of the skeleton graph $\widehat{\mathcal{G}_s}$ within the d hops;

wherein the edge set $\overline{E_f}$ is obtained by: connecting a boundary node to four neighborhood nodes of the boundary node, and forming an edge between the pixel nodes of a local graph $\widetilde{\mathcal{G}_f}$ and the local graph $\widetilde{\mathcal{G}_m}$, if there is a boundary connection for the local graph $\widetilde{\mathcal{G}_f}$ and the local graph $\widetilde{\mathcal{G}_m}$ in corresponding superpixel regions thereof, or, forming only the edge between the pixel nodes of the local graph $\widetilde{\mathcal{G}_f}$ and the local graph $\widetilde{\mathcal{G}_m}$, if there is no boundary connection for the local graph $\widetilde{\mathcal{G}_f}$ and the local graph $\widetilde{\mathcal{G}_m}$ in corresponding superpixel regions thereof, that is, there is edge connection between the pixel nodes of the local graph $\widetilde{\mathcal{G}_f}$ and the local graph $\widetilde{\mathcal{G}_m}$;

wherein a Laplacian matrix $\overline{L_f}$ of the f-th sub-graph $\overline{\mathcal{G}_f}$ is obtained, and a same sub-graph is applied to all bands of the hyperspectral image corresponding to the sub-graph;

wherein a graph signal of the sub-graph node $v \in \overline{V_f}$ of the f-th sub-graph is mapped into a vector $X_{f,b}=[X_f(1,b), X_f(2,b), \ldots, X_f(\Sigma K_m, b)]^T \in \mathbb{R}^{\Sigma K_m}$, where $m \in B_{\widehat{\mathcal{G}_s}}(f,d)$, $b=1, \ldots, p$, $X_f(i, b)$ represents a graph signal of the i-th sub-graph node corresponding to the b-th band in the f-th sub-graph $\overline{\mathcal{G}_f}$, $X_f(1, b)$ represents a graph signal of a first sub-graph node corresponding to the b-th band in the f-th sub-graph $\overline{\mathcal{G}_f}$, $K_m$ represents a total number of pixels in the superpixel region corresponding to the m-th local graph on the f-th sub-graph $\overline{\mathcal{G}_f}$, and b represents the b-th band; and wherein a matrix is formed based on graph signals of all bands using a formula expressed as follows: $X_f=[X_f(i, b)]=[X_{f,1}, \ldots, X_{f,b}, \ldots, X_{f,p}] \in \mathbb{R}^{(\Sigma K_m) \times p}$, $m \in B_{\widehat{\mathcal{G}_s}}(f,d)$, and thus the graph signal of the hyperspectral image on the sub-graph $\overline{\mathcal{G}_f}$, $f=1, 2, \ldots, M_s$ is obtained.

5. The hyperspectral image distributed restoration method based on graph signal processing and superpixel segmentation according to claim 1, wherein in the step 7, a plurality of computing units are set, each of the plurality of computing units corresponds to one of the plurality of local graphs, and a transmission link with neighbored computing units of the computing unit is established by the computing unit based on edges of the skeleton graph, and wherein the applying the exchange distributed mode to each of the sub-graphs to perform distributed denoising on the hyperspectral image, comprises:
receiving computing results from the neighbored computing units when each of plurality of iterations is performed;
fusing and averaging, by the computing unit, the received computing results from the neighbored computing units with a last calculation result of the computing unit;
determining, by the computing unit, an optimized computing result of the computing unit and optimized computing results of the neighbored computing units based on the optimization model of each of the sub-graphs; and
transmitting, by the computing unit, the optimized computing result of the computing unit and a corresponding one of the optimized computing results of the neighbored computing units to a corresponding one of the neighbored computing units.

6. The hyperspectral image distributed restoration method based on graph signal processing and superpixel segmentation according to claim 1, wherein in the step 8, the optimization model is expressed as a formula (3):

$$\min_{X_f, S_f \in \mathbb{R}^{(\Sigma K_m) \times p}} \|X_f\|_* + \alpha \|X_f\|_{GLR} + \beta \|S_f\|_1 \quad (3)$$

$$\text{s.t. } \|O_f - X_f - S_f\|_F^2 \le \varepsilon, \text{rank}(S_f) \le r,$$

where $m \in B_{\overline{\mathcal{G}_s}}(f,d)$, $K_m$ represents a total number of pixels in the m-th superpixel region, $\alpha$ and $\beta$ are two parameters, and used to adjust proportions of a kernel norm, GLR and an $L_1$ norm, $S_f$ represents a model of sparse noise of in the f-th sub-graph, $O_f$ represents hyperspectral image data originally input in the f-th sub-graph, E represents a threshold value, r is a constant for indicating constraint on a rank of a hyperspectral signal; f represents an integer;

wherein GLR of signals of one band of the HSI is expressed as a formula (4):

$$\|x\|_{GLR} = x^T L_{\overline{\mathcal{G}_f}} x = \Sigma_{i \sim j} a_{i,j} \cdot (x_i - x_j)^2 \quad (4),$$

the GLR of signals of all bands of the HSI is expressed as a formula (5):

$$\|X\|_{GLR} = Tr(X^T L_{\overline{\mathcal{G}_f}} X) = \|x_1\|_{GLR} + \ldots + \|x_b\|_{GLR} + \ldots + \|x_p\|_{GLR} \quad (5),$$

where $L_{\overline{\mathcal{G}_f}}$ represents a Laplacian matrix of the f-th sub-graph, $a_{i,j}$ represents the (i,j)-th element of an adjacency matrix of the f-th sub-graph; $x_i$ represents the i-th graph signal of the f-th sub-graph; $\|X_b\|_{GLR}$ represents a GLR corresponding to the b-th band; and $Tr(\cdot)$ represents a trace of a matrix.

7. The hyperspectral image distributed restoration method based on graph signal processing and superpixel segmentation according to claim 6, wherein in the step 8, the optimization model is obtained according to augmented Lagrange method;

wherein the formula (3) is equivalently converted into a formula (6):

$$\min_{H_f, X_f, S_f \in \mathbb{R}^{(\Sigma K_m) \times p}} \|H_f\|_* + \alpha \|X_f\|_{GLR} + \beta \|S_f\|_2 \quad (6)$$

$$\text{s.t. } \|O_f - H_f - S_f\|_F^2 \le \varepsilon, \text{rank}(H_f) \le r, H_f = X_f,$$

where $H_f$ represents an introduced auxiliary variable, and $H_f = X_f$;

wherein an augmented Lagrange function of the formula (6) is expressed as a formula (7):

$$\ell(H_f, X_f, S_f, C_f, D_f) =$$
$$\|H_f\|_* + \alpha \|X_f\|_{GLR} + \beta \|S_f\|_2 + \langle C_f, O_f - H_f - S_f \rangle +$$
$$\langle D_f, X_f - H_f \rangle + \frac{\gamma}{2} \left( \|O_f - H_f - S_f\|_F^2 + \|X_f - H_f\|_F^2 \right)$$
$$\text{s.t. rank}(H_f) \le r,$$

where r represents a penalty variable, which is greater than zero, and $C_f$ and $D_f$ represent Lagrange multipliers;

wherein the formula (7) is alternately optimized through following updatings:
1) updating $H_f$ $$H_f^{(k+1)} = \underset{\text{rank}(H_f) \le r}{\text{argmin}} \ell(H_f, X_f^{(k)}, S_f^{(k)}, C_f^{(k)}, D_f^{(k)}) = \quad (8)$$

$$\underset{\text{rank}(H_f) \le r}{\text{argmin}} \|H_f\|_* + \langle C_f^{(k)}, O_f - H_f - S_f^{(k)} \rangle +$$

$$\langle D_f^{(k)}, X_f^{(k)} - H_f \rangle + \frac{\gamma}{2} \left( \|O_f - H_f - S_f^{(k)}\|_F^2 \frac{\gamma}{2} \|X_f^{(k)} - H_f\|_F^2 \right) =$$

$$\underset{\text{rank}(H_f) \le r}{\text{argmin}} \|H_f\|_* + \gamma \left\| H_f - \frac{1}{2} \left( O_f + X_f^{(k)} - S_f^{(k)} + \frac{1}{\gamma} (C_f^{(k)} + D_f^{(k)}) \right) \right\|_F^2,$$

where (k+1) represents a (k+1)-th iteration, $X_f^{(k)}$ represents the denoised hyperspectral image after the k-th iteration of the f-th sub-graph, $S_f^{(k)}$ represents sparse noise after the k-th iteration of the f-th sub-graph, $C_f^{(k)}$ and $D_f^{(k)}$ represent Lagrange multipliers after the k-th iteration of the f-th sub-graph;

wherein for a given matrix $Z \in \mathbb{R}^{K \times p}$ with a rank r, singular value decomposition is used to decompose the given matrix, to obtain a formula (9):

$$Z = U E_r V^H, E_r = \text{diag}(\sigma_i) \quad (9),$$

where $U \in \mathbb{R}^{K \times r}$ and $V \in \mathbb{R}^{p \times r}$ are orthogonal matrices, $E_r$ represents a diagonal matrix composed of singular values, a singular value $\sigma_{i(1 \le i \le r)} \ge 0$, a threshold value $\phi$ being greater than or equal to zero is given, and a singular value contraction operator is defined as a formula (10):

$$D_\phi(Z) = U D_\phi(E_r) V^H$$

$$D_\phi(E_r) = \text{diag}(\max(\eta, 0)), \quad (10)$$

where $\eta = \sigma_i - \phi$, $\eta$ represents a vector composed of a difference between the i-th singular value $\sigma_i$ and a threshold value $\phi$, $\sigma_i$ represents the i-th singular value after singular value decomposition, $\phi$ represents a constant, which is the threshold value, $D_\phi(\cdot)$ represents a solution of a singular value contraction operator, the singular value contraction operator (10) is a solution of a problem (11):

$$D_\phi(Z) = \underset{\text{rank}(H) \le r}{\text{argmin}} \|H\|_* + \frac{1}{2\phi} \|H - Z\|_F^2, \quad (11)$$

wherein the singular value contraction operator (10) is used to optimize a solution of the formula (8) to obtain a formula (12):

$$H_f^{(k+1)} = D_{\frac{1}{2\gamma}} \left( \frac{1}{2} \left( O_f + X_f^{(k)} - S_f^{(k)} + \frac{1}{\gamma} (C_f^{(k)} + D_f^{(k)}) \right) \right), \quad (12)$$

2) updating $X_f$ $$X_f^{(k+1)} = \underset{X}{\text{argmin}} \ell(H_f^{(k+1)}, X_f, S_f^{(k)}, C_f^{(k)}, D_f^{(k)}) \quad (13)$$

$$= \underset{X_f}{\text{argmin}} \alpha \|X_f\|_{GLR} + \langle D_f^{(k)}, X_f - H_f^{(k+1)} \rangle + \frac{\gamma}{2} \|X_f - H_f^{(k+1)}\|_F^2,$$

$$= \underset{X_f}{\text{argmin}} \alpha \|X_f\|_{GLR} + \frac{\gamma}{2} \left\| X_f - H_f^{(k+1)} + \frac{D_f^{(k)}}{\gamma} \right\|_F^2,$$

where $B_f = H_f^{(k+1)} - D_B^{(k)}/\gamma + [b_1, \ldots, b_p]$, according to the matrix form of GLR in the formula (5), the formula (13) is equivalent to a formula (14):

$$X_f^{(k+1)} = \underset{X_f = [x_1, \cdots, x_p]}{\text{argmin}} \sum_{j=1}^{p} (\alpha \|x_j\|_{GLR} + \frac{\gamma}{2}(\|x_j - b_j\|_2^2)), \quad (14)$$

wherein the formula (14) is decomposed into p subproblems and solved band by band, and the j-th subproblem of the p sub-problems is expressed as a formula (15):

$$x_j^{(k+1)} = \underset{x_j}{\text{argmin}} \, \alpha \|x_j\|_{GLR} + \frac{\gamma}{2}(\|x_j - b_j\|_2^2 = \alpha x_j^T L_{\overline{\mathcal{G}_f}} x_j + \frac{\gamma}{2}\|x_j - b_j\|_2^2, \quad (15)$$

wherein the formula (15) is a least squares problem, and a solution of the formula (15) is expressed as a formula (16):

$$x_j^{(k+1)} = (2\alpha L_{\overline{\mathcal{G}_f}} + \gamma I)^{-1} \gamma b_j \quad (16),$$

wherein a solution of the formula (14) is obtained by combining the solutions (16) of each band and is expressed as a formula (17):

$$[x_1^{(k+1)}, \cdots, x_f^{(k+1)}, \cdots, \quad (17)$$
$$x_p^{(k+1)}] = [(2\alpha L_{\overline{\mathcal{G}_f}} + \gamma I)^{-1} \gamma b_1, \cdots m(2\alpha L_{\overline{\mathcal{G}_f}} + \gamma I)^{-1} \gamma b_f, \cdots,$$
$$(2\alpha L_{\overline{\mathcal{G}_f}} + \gamma I)^{-1} \gamma b_p] = (2\alpha L_{\overline{\mathcal{G}_f}} + \gamma I)^{-1} [b_1, \cdots, b_f, \cdots, b_p],$$

wherein the formula (17) is rewritten in matrix form expressed in a formula (18):

$$X_f^{(k+1)} = (2\alpha L_{\overline{\mathcal{G}_f}} + \gamma I)^{-1} B_f \quad (18)$$

wherein by derivation, the formula (13) is equivalently transformed to a formula (19):

$$X_f^{(k+1)} = \underset{X_f}{\text{argmin}} \, \alpha \|X_f\|_{GLR} + \frac{\gamma}{2}\left\|X_f - H_f^{(k+1)} + \frac{D_f^{(k)}}{\gamma}\right\|_F^2 \quad (19)$$
$$= \underset{X_f}{\text{argmin}} \, \alpha Tr(X_f^T L_{\overline{\mathcal{G}_f}} X_f) + \frac{\gamma}{2}\left\|X_f - H_f^{(k+1)} + \frac{D_f^{(k)}}{\gamma}\right\|_F^2$$
$$= (2\alpha L_{\overline{\mathcal{G}_f}} + \gamma I)^{-1}\left(H_f^{(k+1)} - \frac{D_f^{(k)}}{\gamma}\right),$$

3) updating $S_f$ $$S_f^{(k+1)} = \underset{S_f}{\text{argmin}} \, \ell(H_f^{(k+1)}, X_f^{(k+1)}, S_f, C_f^{(k)}, D_f^{(k)}) \quad (20)$$

$$= \underset{S_f}{\text{argmin}} \, \beta\|S_f\|_1 + \langle C_f^{(k)}, O_f - H_f^{(k+1)} - S_f\rangle + \frac{\gamma}{2}\|O_f - H_f^{(k+1)} - S_f\|_F^2$$

$$= \underset{S_f}{\text{argmin}} \, \beta\|S_f\|_1 + \frac{\gamma}{2}\left\|S_f - \left(O_f - H_f^{(k+1)} + \frac{C_f^{(k)}}{\gamma}\right)\right\|_F^2,$$

wherein a soft threshold operator is introduced and expressed as a formula (21):

$$R_\Delta(\varphi) = \begin{cases} \varphi - \Delta, & \text{if } \varphi > \Delta \\ \varphi + \Delta, & \text{if } \varphi < \Delta, \\ 0, & \text{otherwise} \end{cases} \quad (21)$$

where $\varphi \in \mathbb{R}$, $\Delta > 0$, and a solution of the formula (20) is expressed as a formula (22):

$$S_f^{(k+1)} = R_{\frac{\beta}{\gamma}}\left(\left(O_f - H_f^{(k+1)} + \frac{C_f^{(k)}}{\gamma}\right)\right), \quad (22)$$

4) updating the Lagrange multipliers $C_f$ and $D_f$, and the penalty variable $\gamma$ $$C_f^{(k+1)} = C_f^{(k)} + \gamma(O_f - H_f^{(k+1)} - S_f^{(k+1)})$$

$$D_f^{(k+1)} = D_f^{(k)} + (X_f^{(k+1)} - H_f^{(k+1)})$$

$$\gamma^{(k+1)} = \min(\rho\gamma^{(k)}, \gamma_{max}), \quad (23)$$

where $\rho$ represents a growth step, and $\gamma_{max}$ represents a constant.

8. The hyperspectral image distributed restoration method based on graph signal processing and superpixel segmentation according to claim 1, wherein in the step 9, the iterative convergence condition is determined according to a formula (24):

$$\|O_f - H_f^{(k+1)} - S_f^{(k+1)}\|_F / \|O_f\|_F \leq \varepsilon_1$$

$$\|H_f^{(k+1)} - X_f^{(k+1)}\|_\infty \leq \varepsilon_2, \quad (24)$$

where $\varepsilon_1$ and $\varepsilon_2$ represent two constants, $H_f^{(k+1)}$ represents introduced auxiliary variable and is a solution of $H_f = X_f$ after (k+1) iterations, $S_f^{(k+1)}$ represents a solution of sparse noise after (k+1) iterations of the f-th sub-graph, and $X_f^{(k+1)}$ represents a solution of a clean hyperspectral image after (k+1) iterations of the f-th sub-graph.

9. A hyperspectral image distributed restoration system based on graph signal processing and superpixel segmentation, comprising: a memory, a processor, and a computer program stored in the memory and executable by the processor, wherein the hyperspectral image distributed restoration method based on graph signal processing and superpixel segmentation according to claim 1 is implemented when the computer program is executed by the processor.

* * * * *